(12) United States Patent
Senghaas et al.

(10) Patent No.: US 6,363,785 B1
(45) Date of Patent: Apr. 2, 2002

(54) RELATIVE LOCATION DETECTION SENSOR

(76) Inventors: Karl A. Senghaas, 434 Forrest Hill Dr.; Peter Senghaas, 334 Olney Dr., both of San Antonio, TX (US) 78209; Jerzy Michalec, 1903 Flint Oak, San Antonio, TX (US) 78248; Peter T. Kolonko, Jr., 9110 Broadway, #B103, San Antonio, TX (US) 78217; John H. Gold, 4343 Eagle Nest, San Antonio, TX (US) 78233

( * ) Notice: Subject to any disclaimer, the term of this patent is extended or adjusted under 35 U.S.C. 154(b) by 0 days.

(21) Appl. No.: 09/290,905

(22) Filed: Apr. 12, 1999

Related U.S. Application Data

(63) Continuation of application No. 08/735,651, filed on Oct. 24, 1996, now abandoned.

(51) Int. Cl.$^7$ .............................................. G01F 23/74
(52) U.S. Cl. ..................... 73/313; 73/319; 73/DIG. 5
(58) Field of Search .................. 73/313, 319, DIG. 5; 200/84 C; 340/624

(56) References Cited

U.S. PATENT DOCUMENTS

| | | | | |
|---|---|---|---|---|
| 3,377,537 A | * | 4/1968 | Brailsford | |
| 3,505,869 A | * | 4/1970 | Crawford | 73/313 |
| 4,227,236 A | * | 10/1980 | Kubler | 73/313 X |
| 4,536,660 A | * | 8/1985 | Tetro | 307/118 |
| 5,347,864 A | * | 9/1994 | Senghaas et al. | 73/313 |
| 5,478,966 A | * | 12/1995 | Sugi | 73/313 |
| 5,627,523 A | * | 5/1997 | Besprozvanny et al. | 73/313 X |
| 5,744,701 A | * | 4/1998 | Peterson et al. | 73/49.2 |

FOREIGN PATENT DOCUMENTS

SU          434272 A   *   9/1972   ............. 73/DIG. 5

* cited by examiner

Primary Examiner—Hezron Williams
Assistant Examiner—Willie M. Worth
(74) Attorney, Agent, or Firm—Kilpatrick Stockton LLP

(57) ABSTRACT

In one embodiment, a relative location detection apparatus including a detection unit having a support board having a plurality of spaced reed switches mounted along a lengthwise axis of the support board. Each of the reed switches has a longitudinal axis oriented substantially perpendicular to the lengthwise axis of the support board. A high intensity magnet is coupled to the support board for movement relative to the support board and in a direction substantially parallel to the support board's lengthwise axis. The magnet has north and south poles that are oppositely positioned to one another and directed toward one another across a width of the support board and into periodic alignment with the longitudinal axes of the reed switches. The magnet has a magnetic force sufficiently focused so that the magnet actuates the reed switches individually thereby indicating the magnet's location.

7 Claims, 21 Drawing Sheets

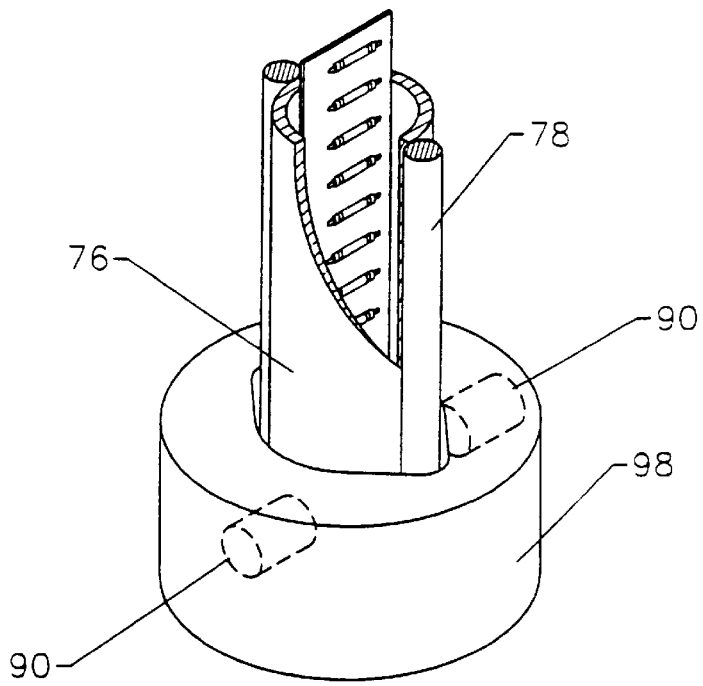
Fig. 15
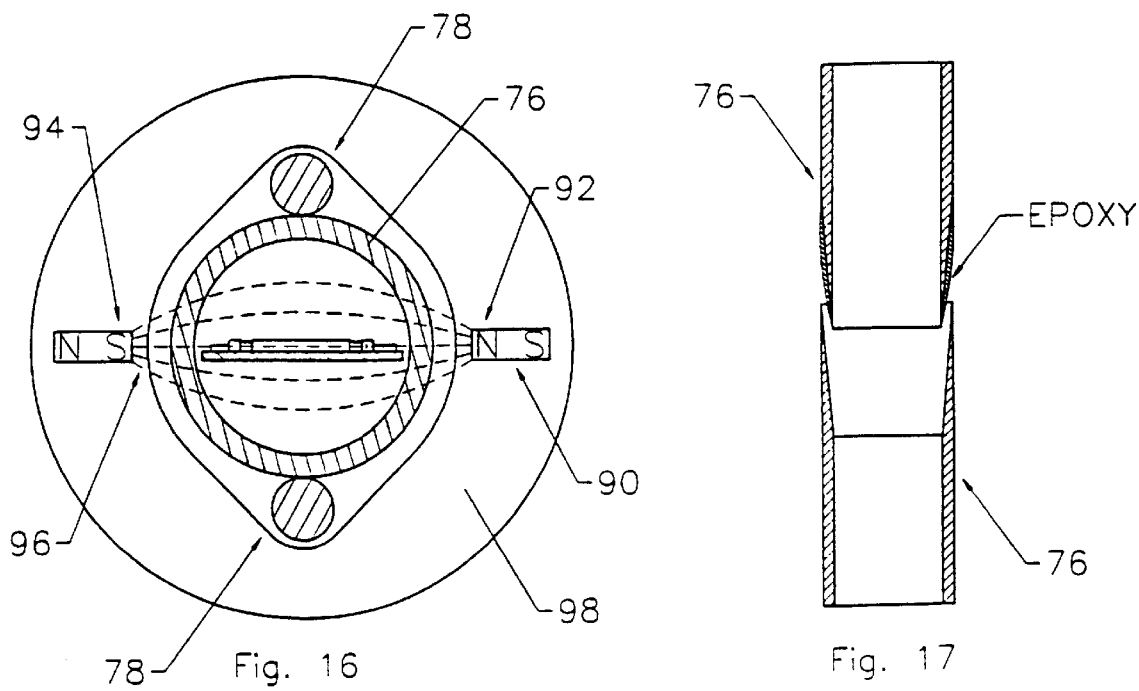
Fig. 16
Fig. 17

RELATIVE LOCATION DETECTION SENSOR

RELATED PATENT APPLICATIONS

This is a continuation patent application of U.S. patent application Ser. No. 08/735,651 filed Oct. 24, 1996 entitled "RELATIVE LOCATION DETECTION SENSOR" now abandoned. The full disclosure of said application in its entirety is hereby expressly incorporated by reference into the present application.

DESCRIPTION

1. Technical Field

This invention relates to systems and methods for determining the relative location of items with respect to one another. More particularly, it relates to methods and apparatus for detecting and reporting the relative location of an indicating unit traveling along the length of an elongate detector. In a preferred embodiment, this invention senses the position of a magnetic indicating unit relative to an elongate detector thereby determining and reporting the location of one or more fluid interfaces within a multi-phase fluid reservoir.

2. Background Art

Many instances arise in both industrial and residential settings wherein the location of a reference point is desired to be detected and reported for evaluation. Many alternative methods may be employed for such purposes; an example is a video camera that either transmits or records a visual image of items that an operator desires to monitor. One drawback of such a system is that an operator is required to observe the image, make an evaluation, and then report that information for further processing if so required. With the advent of computers used as controllers for various processes, it is desirable to have automatic reporting systems that indicate relative locations of different components in a system. In a residential setting, an example would be a garage door that opens and closes by traversing tracks. In the event that the operation of such a door were to be automated, it would be necessary for the controller to know the relative position of the door with respect to the tracks thereby indicating its open or closed configuration, or its relative position somewhere in between. Such detection and reporting may be achieved by placing an elongate stationary detector along the track of the garage door and installing an indicating unit upon the traveling door in a position that travels adjacent to the length of the detector. By detecting and reporting the location of the indicating unit, a controller for the system can ascertain the door's position and take action based thereon.

A linear relative location detecting and reporting system of the present invention finds a myriad of applications in industrial settings. In manufacturing processes, there are many instances in which human operators or automated controllers must know real time relative positions of certain parts in an apparatus. One particularly applicable situation is found in automated manufacturing processes wherein assembly lines are employed. By being able to detect the relative position of a conveyor within the manufacturing process, the degree of advancement or completion of a given task is detectable and reportable for control and evaluation purposes.

One particular industrial application and environment in which such a detection system has been found to be desirable is in liquid reservoirs wherein the position of fluid interfaces are desired to be detected. By detecting the interfaces between phases of fluids, the level, and normally the volume of one or more fluids present in a reservoir or container may be calculated.

In some circumstances, the interface will be between two fluids, each in a different state. The lower fluid will normally be in a liquid state and the upper fluid will typically be in a gaseous state. These conditions are common to most fluid filled tanks. Examples of such situations include containers for gasoline, water, crude oil, and liquid chemicals that are often retained in holding tanks. In each case, the lower phase of a fluid interface is liquid and the upper phase is usually air that fills the remainder of a partially filled tank. A detector may be similarly utilized in less contained environments such as in subterranean reservoirs and in flood plane areas to measure water level conditions.

There are several known devices that are employed in liquid reservoirs for detecting interfaces, and in turn liquid levels of both single and multi-phase liquids. Two such examples have been previously invented and patented by a common inventor of the present invention in U.S. Pat. Nos. 4,976,146 and 5,347,864 for Liquid Level Measuring Apparatuses issued to Senghaas. Each of those systems, however, employ different apparatus and methods of operation than is presently being disclosed. In each, a plurality of reed switches are installed upon an elongate support or back board in an angled configuration with respect to the length of that board. The apparatus of the two Senghaas Patents '146 and '864 each employ reed switches arranged in a vertical series, but each switch is significantly angled with respect to horizontal.

The reed switches operate in response to magnetic forces applied thereto. When no magnetic force or same pole magnetic forces are applied to each of two leads of the switch, the reed portions are biased away from one another thereby keeping the switch open and preventing current from being transmittable thereacross. Oppositely, when magnetic forces of opposite or north and south poles are applied to the leads of the reed switch, the two reeds of the switch are attracted to one another thereby closing the switch and accommodating the transmission of applied current thereacross. The overlapped configuration of adjacent switches accommodates a cancellation affect that is utilized for achieving an error correcting procedure, but which is no longer required in the present invention.

Each of the '146 and '864 inventions employ one or more toroidal magnets that surround the series of angled vertical switches and move relative thereto in an up and down direction. The use of such toroidal magnets slidably fitted about a series of detection switches have also been employed in such earlier examples as the Hall-Cell Liquid Level Detector disclosed in U.S. Pat. No. 4,361,835 issued Nov. 30, 1982 to Nagy. While reed switches were not employed in the '835 patent, Hall-Cell sensors were alternatively used as detectors responsive to the influence of toroidal or donut-shaped magnets moved up and down the length of a series of such Hall-Cells.

The measuring devices of the earlier Senghaas patents, like the present invention, have a common physical constraint because of the environment in which they are most commonly utilized. That environment is installation in liquid containing tanks, and more specifically in large above ground holding tanks for crude oil, water and the like that have been constructed to accept liquid level measuring devices that are inserted through a pre-formed aperture in the top of the tank. Because of the high cost associated with modifying this aperture, it is important that new devices developed for employment in such applications and settings be constructed to satisfy the criteria and limitations of these tanks and the existing measuring device receiving apertures.

In some instances, the tops or covers of such tanks rise and fall together with the level of liquid contained therein. Therefore, sliding movement of the lid about the measuring device must be facilitated. To alter this preexisting configuration of the tanks would be exceedingly expensive and prohibitive to the employment of measuring devices that deviate from these constraints. Therefore, these apertures dictate the maximum diameter or width of measuring devices that may be inserted therein. As a result, the size of the aperture also governs the width of the support board upon which the reed switches are mounted in both the previously known measuring devices and that of the present invention.

Because of performance limitations of components employed in the earlier measuring apparatuses of the '146 and '864 patents, it was necessary that the reed switches be angularly positioned with respect to horizontal on their supporting back boards. Specifically, the actuating toroidal magnets heretofore available had a limited strength and therefore required a more substantial lead area, sometimes achieved through elongation of the reed switch leads, in order for the switch to be influenceable to a closed configuration by the magnet. To accommodate these relatively long lead lengths on each side of the reed switch necessary to be responsive to the relatively low magnetic force of the available toroidal magnets, the angled orientation was utilized to permit elongation of the individual switches and facilitate the "cancellation" effect of adjacent switches during operation. This orientation, however, compromises not only the manufacture of the apparatus, but also its utility by restricting conditions for transport, as well as affecting the switch's sensitivity to the magnetic field produced from within the magnet-carrying float.

Because of the requirement that the reed switches be positioned upon the back board in an angular orientation, the installation of each individual switch must be made manually. This necessitates personnel being employed for a highly intricate and repetitive task. As a result, these assemblers are at risk of developing such conditions as carpal tunnel syndrome caused by the repetitive and tedious manual manipulation. Therefore, the possibility of injury to the worker has made it highly advantageous to facilitate an orientation wherein the installation of the reed switches may be automated. Such a condition is found in the present invention wherein, because of a new and inventive design, the reed switches are able to be oriented in a substantially horizontal configuration that is perpendicular to the length of the support board upon which the switches are mounted.

Not only were the toroidal magnets employed in the previous systems of relatively low magnetic strength, but the magnetic force developed by the toroidal magnets was not focused inwardly toward the switches. Instead, a magnetic field was developed about several switches which were influenced as a group by the toroidal magnet. Because of the inability to focus the effects of the toroidal magnet upon a single switch, it was necessary that the series of switches be overlapped with respect to adjacent switches to provide sufficiently fine position indications.

An example of such a previously known measuring apparatus is illustrated in FIGS. 4, 8 and 11 As may be seen in the widthwise cross-section of FIGS. 8 and 11 the previous reed switch was mounted above the back board on leads that extend upwardly and away from the back board and then inwardly toward the reed portions that are flexible between open and closed switch configurations. Because of the switch's elevated configuration, damage is likely if the switch is pressed against in the direction of the board. This potential damage stems from the construction of the switch which includes a glass housing or sheath in which the reeds of the switch are intended to be protected for more reliable operation. Each lead portion that extends outside the housing is contiguous in most instances with an associated reed portion within the housing. An interface occurs where the elongate lead/reed member enters the glass housing. This interface can serve as a pivot point between the two portions on either side of the glass housing when downward pressure toward the board is experienced on the elevated housing. This can result in a distortion of the intended orientation of the interiorly located reed portions. In many instances, relatively soft metals are employed in the manufacture of the lead/reed members to potentiate responsiveness to a magnetic field, while at the same time resist becoming magnetized. One of the drawbacks, however, of these softer metals is that they are more susceptible to plastic deformation, as opposed to elastic deformation, and will not regain their original positions once deformed, such as when being depressed toward the back board. These changes in orientations are likely to adversely affect operation of the deformed switch.

The back board, as shown in FIG. 8, is relatively rigid in a widthwise direction. In contrast, the back board is substantially more flexible in a lengthwise direction as is illustrated in FIG. 11. If the back board is flexed as shown in FIG. 6, there is a likelihood that the reed switches mounted thereon will become misaligned to an extent that they fail to operate as designed. The back board may be sufficiently flexed during transport to distort the position of the reeds inside the glass body of the switch so that it never regains its original and operatable configuration and therefore fails to operate upon installation. As a result of this detrimental effect, systems manufactured according to these previous designs had to be transported under strict conditions to prevent the above described damage to the individual reed switches. This is a significant disadvantage in that it requires the measuring apparatuses to either be assembled on site or to be transported in a rigidified and elongate state. Each of these two options have proved burdensome.

If required to assemble the measuring apparatus on site, it is possible that the operation of the unit will be compromised because of inhospitable conditions experienced at many tank locations. Among others, there will likely be dirt and dust that can affect the system's operation, as well as environmental conditions such as extreme heat that affects those personnel required for assembly. Similarly disadvantageous is assembling these systems in a factory setting and transporting them to a remote site in an elongate rigid state using trucks with long beds. Because most trucks are designed to carry articles of substantial weight when such a length is required, the employment of such trucks is exceedingly expensive in view of the apparatus' relative light weight, but long length.

The microprocessor control of these prior systems require that the switches be assembled in a specific order and that that order be maintained because of the reporting processes for transmitting closed-switch information up the elongate detector to the microprocessor at the sensor's top end. Because each switch is identified and mapped to the controller based on its position, it is required that the switches and the back boards to which they are attached be assembled in a prescribed order. It is also necessary that assembly be made by a trained technician to assure that all proper conductive connections are achieved in the assembled measuring apparatus. In that the number of switches employed upon a particular measuring apparatus dictates the number of communication paths and interconnections required to transmit detected data to the microprocessor, these paths and interconnections increase with sensor length. This imposes not only manufacturing and assembly constraints on the previous designs, but it also necessitates the employment of experienced and trained personnel for installation. In view of these known constraints, it has therefore become highly desirable to have a design that may be more compactly transported and assembled on site without the inherent deficiencies associated with the prior designs disclosed in the '146 and '864 patents.

In view of the above described deficiencies associated with the use of known detection sensors, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventional detection sensors and incorporates several additionally beneficial features. This invention includes features and/or components that have been invented and selected for their individual and combined benefits and superior performance as a relative location detecting and reporting system. The system includes multiple components that individually and singularly have new and novel features in and of themselves. Each of the individual components, however, work in association with each other to achieve many of the benefits derived from the system. Together, the components yield an overall relative location detection and reporting system that has superior effectiveness and performance over previously designed systems for accomplishing similar results.

The present invention is contemplated to be employable in many environments, including both residential and industrial, wherein its detecting and reporting features may be advantageously utilized. As described above, the present invention will be useful where it is desired to know the location of an item traveling along an elongate path both with respect to position and change in position with respect to time. Therefore, not only are time fixed quantities such as a liquid level height or an object's distance from a starting position able to be determined and/or calculated through the use of the present invention, but such time relative quantities as speed and acceleration may also be ascertained.

While the embodiments illustrated herein show elongate detectors that are configured upon substantially straight line or linear configurations, it is also possible that the detector may be curvilinearly shaped thereby facilitating employment in manufacturing and other applications wherein the path upon which items are to be monitored is curvaceous and potentially three dimensional in travel course. An example is an assembly line's path through a factory and the employment of the present invention's elongate detection unit for monitoring an indicator that may be carried either upon the circulating mechanism or conveyor belt of the assembly or upon an item being carried upon the conveyor as illustrated in FIG. 3. In either case, useful information may be detected and processed for automated control of the manufacturing operation.

A preferred embodiment of the present invention is utilized for detecting fluid interfaces in a multi-phase fluid reservoir. It is contemplated that its employment may be in containers such as tanks or in uncontained environments both above ground and at subterranean levels. It is also contemplated that the present invention may find application in multi-phase fluid bodies wherein lower phases are in a liquid states and upper phases are in gaseous states. Still further, it is also contemplated that more than one interface may be detected by a single sensor. In preferred embodiments, these detections are accomplished by one or more floating indicators wherein each floating indicator carrier has a density that causes that indicator to ride substantially at the interface of two different fluid phases.

Because of the present invention's novel structure and inclusion of newly available technologies and components heretofore unavailable, beneficial features are enjoyed with respect to manufacturing and production, transport, assembly, and operation of the relative location detection apparatus. A primary feature responsible for the present invention's superior characteristics and performance is best appreciated in FIG. 7. Therein, a horizontal orientation of a plurality of reed switches is shown with respect to the support board upon which the reed switches are mounted. In a preferred embodiment, the support board is constructed from a printed computer circuit board upon which several reed switches are mountable and upon which electrical transmission lines are integrated and carried.

In an alternative embodiment, the configuration of the individual switches may not be fixed on a support board, but instead established by connection within an orienting flexible housing or sheath. This flexible combination may then be rigidified by a separate member into which the combination is installed for use. An example of such a rigidifying member would be a C-shaped angle constructed from substantially rigid material that would fix the several switches' relative positions by their installation into the void of the interior of the C-shaped member.

The horizontal orientation of the switches provides many benefits and is made possible at least in part by the utilization of a specialized high intensity magnet previously unknown in such an application. The discovery of such an application of the high intensity magnet has greatly simplified manufacture of the detector by facilitating the superior horizontal configuration of the switches.

In a preferred embodiment, the high intensity magnet includes a unique material, neodymium, as a constituent component. This material is capable of taking a superiorly strong magnetic charge. Not only is the magnetic charge and resultant exertable force exceedingly strong, but it is also focusable so that its effects are more accurately directed and applied to an individual reed switch without affecting adjacent switches. The characteristics of the high intensity neodymium magnet in comparison to the previously described and employed toroidal magnets may be likened to a focused laser beam compared to the divergent light beam of conventional light sources.

The employment of such a high intensity magnet has facilitated the horizontal configuration of the reed switches. That is, reed switches having shorter leads may be employed because they are operationally responsive to the greater power of the high intensity magnets, where they would not have been responsive to the weaker toroidal magnets. By reducing the lead lengths of the switches, the horizontal orientation of the switch across the support board is possible. This is so even in view of the fact that the width of the support board remains dominated in most cases by outside constraints such as the dimensions of apertures through which the sensor must be insertable as described hereinabove. Because the focused magnetic force does not affect adjacently positioned switches, a close configuration of successive switches is made possible resulting in relatively fine resolution capabilities with respect to detectable indicator positions.

The horizontal and uniformly spaced orientation of the reed switches in their installation upon the support board facilitates automation of the installation process. Whereas manual fixation of each reed switch was previously required, all reed switches are now capable of being automatically positioned and mounted upon the support board. Because of this new horizontal orientation of the switches across the support board, the switches may be purchased in standard reel form and applied in an automated manner without direct manual manipulation required. The Zevatech Placemat 560 Laser is an example of an appropriate automated placement machine utilizable for this process. This has eliminated a tedious task for personnel and otherwise freed their time for more stimulating and productive tasks.

The horizontal orientation of the reed switches, as opposed to the previously angled orientation, prevents distortion of the reed switch from lengthwise flexing or bending of the support board. This feature enables two major beneficial characteristics of the present invention: the first being prevention of damage to the reed switch because there is no longer a twisting or torque effect experienced in the perpendicularly oriented switch and the second being the ability to facilitate and enhance the support board's ability to bend in a lengthwise manner. The enhanced bending characteristic has been found to be highly beneficial because a coiled orientation of the elongate and assembled support board is now possible for transport purposes. Because there is an almost negligible risk of damage to the switches upon such coiling, the support board may be suitably constructed to allow at least the detection unit portion of the invention to be coiled as tightly as upon a three foot diameter. In this coiled configuration, the unit may be appropriately packaged and quite easily shipped to an installation site.

Because of the almost elimination of deformation to the switch in the present invention, the specific orientation of the switch upon the support board is no longer as critical as in previously known devices. As may be appreciated in FIGS. 8 and 11 flat reed and lead portions were primarily utilized in previously known devices. As a result, the glass encasing housings of the switches were generally rectangular in cross-sectional shape and helped assure that the switches were properly oriented on the back board when fixed thereto. By contrast, the present invention can utilize switches in which the lead and/or reed portions are flat and ribbon shaped or cylindrically shaped as may be appreciated in FIGS. 12 and 13. Still further, the reed portions may be located above and below one another or side-by-side when installed on the support board. Each of these features is facilitated by the fact that no deformation is imparted to the switch, even when the switch-carrying support board is wrapped into a coiled configuration as shown in FIG. 14.

As a further enhancement to the new design of the present invention, recesses have been provided in the support board for the reed switches as shown in FIGS. 9 and 12. In a preferred embodiment, an individual elongate recess is provided for each switch in the form of an aperture cut through the support board as shown in FIGS. 10 and 13. Each recess provides a receiving area within the support board for at least a bottom portion of a reed switch. In at least one configuration, the reed switch is constructed with a protective encasement around the flexible reed portions in the form of the glass housing previously described. The recess provides a void within which all or a portion of the switch may be inlaid. This provides a certain degree of protection for the recessed portion of the switch that is contained within the board, but it provides a more general protection of the entire switch by lowering the switch toward the board and causing it to project less distantly way from the board upon which it is carried thereby making the switch less susceptible to damage as a result of being pressed upon. By recessing the switch into the support board, it is possible to have the leads of the switch extend directly outward from ends of the switch and into engagement with a switch-side surface of the board and not form a right angle as previously required. This also reduces the torsional factors and bending forces applied to the switch during flexion of the board along its lengthwise axis. By reducing the distance between the longitudinal lengthwise axis of the switch and widthwise axis of the support board and moving them closer into coincidence with one another, deformation of the switch is reduced thereby facilitating not only the flexibility of the support board, but also the coiled transport configuration described hereinabove. Still further, by cutting away portions of the support board, either in the form of depressions in the board's surface or apertures all the way therethrough, the mass of the board is reduced and it becomes more flexible, particularly with respect to its lengthwise axis. This increased flexibility facilitates the coiled configuration of the detection unit found so highly advantageous for transport purposes. These beneficial characteristics may be best appreciated in FIGS. 4 through 6.

It is expected that at least three embodiments of these sensor systems will be initially manufactured and sold, but others are likely to soon follow. A first of the three embodiments will comprise a fully assembled detection unit that is custom made with respect to length at the factory. This detection unit may then be pre-installed in a protective fiberglass tube as shown in FIG. 15 before shipping. The fiberglass pipe may be constructed from one long section, or created by appropriately connecting several pipe sections together in an end-to-end configuration to achieve the elongate pipe.

As a second alternative, the detection unit may be fabricated to a custom ordered length and then coiled for shipping as shown in FIG. 14. The protective fiberglass pipe may be shipped to the same site in easily transported sections that are connected into the required end-to-end configuration at the site. It is anticipated that the end-to-end connection of the pipe sections may be by any suitable means such as connected matable threads or epoxy glue.

As a third embodiment, it is contemplated that an elongate detection apparatus may be made up of a series of individual detection units that have been plugged together in an end-to-end configuration. Each individual detection unit may have different or similar lengths. By providing three standard lengths of three feet, four feet and five feet, any configuration length may be established in one foot increments greater than three feet. A longer section may also be made available for spanning greater distances with fewer connections.

As will be described in more detail hereinafter, a preferred embodiment of the controlling mechanisms for the present invention facilitate one hundred and twenty switches in a group. It is possible to include more than one group of switches on a given support board and therefore, in theory, boards of almost infinite length may be manufactured.

Each detection unit terminates at each of its two ends in either a plug or a plug receiver. These plugs accomplish not only a physical connection and optional locking of the detection units into an elongate detector, but they also provide the electrical conductivity across the entire length of the elongate detector required for communicating information up and down the system. Through this plugability, shipping is facilitated where relatively short single units are transported to a site before being assembled. It also reduces or eliminates the need for highly trained personnel to assemble the system at the remote site. Similarly, the sensor's plugable construction makes it possible for the detection unit to be easily disassembled after a particular use and reassembled at another location without detriment to the reliability of the detecting and reporting system. This is a substantial benefit over other known sensors which are essentially single use devices because debilitating damage often occurs in the removal and reinstallation of the earlier and less forgiving sensors.

The control and reporting means of the present invention have also been newly developed and provide unique apparatus and methods for detecting and reporting measured conditions. Like other known measuring devices used in liquid reservoirs, the present invention not only detects fluid interfaces in contained fluids, but other conditions such as temperature may also be detected and reported. In the present invention, unlike previously known measuring apparatus, the order of assembly of the several detection units that make up the elongate detector is not critical. Instead, upon start-up of a reading sequence each detection unit is initialized and prescribed an address. This is accomplished by including several reporting and repeating modules that are generally associated with each detection unit: that is, a reporting and repeating module is provided for at least every one hundred and twenty reed switches. Each of those modules is controlled by and reports to a microprocessor interface capable of initiating the operation of each module and the apparatus with which it is associated, but the interface also receives information from the modules and may have capabilities for processing and evaluating that information and transmitting it to a remote location for still further processing.

In order to conserve power which may be limitedly available at the remote site of the system's employment, the components of the apparatus go to a low or non-power consuming "sleep" mode. The controlling interface will normally be programed to initiate a detection process on a regular time basis. For each detection process, an initialization signal is sent from the controller down the elongate detector in a relayed sequence through the consecutive reporting and repeating modules. Upon initialization, each module is awakened and its address specified with respect to its position in the descending order of modules. This is accomplished by sending a first signal to the top module which reads its address and then increments that address plus one and sends it to the next module. That second module receives its plus one address and adds another which is sent to the third module. This process is repeated down the module line until each has been awakened and specified an address. The last module is able to identify itself as such and returns a message which is repeated up through each and every module back to the controlling interface microprocessor signifying that the initialization procedure has been completed. The processor then may poll the detector string for information about closed switches or such other information as temperature readings.

The messages sent down through the detector may be global in nature. That is, no specific detection unit is addressed, instead, the message is characterized by the information it seeks. For instance, when seeking the position of the indicator magnet relative to the elongate detector, a polling message will be sent to the first module. That first module reads the messages and determines that it must detect whether or not one or more of its switches are presently closed by the influence of an adjacently positioned magnet. At the same time, the global message is passed down the line to module two which carries out the same procedure. If a positive response is detected in any one or more detection units, that information is relayed up the detector to the controlling microprocessor. The reading sequence will not conclude until the lower most module has reported indicating that each module in the string has been polled. Alternatively, now that each module is known to the interface, specifically addressed messages may be passed through the detector. In that case, each module receives the message and reviews the address to see if it matches its own. If it does not, it passes by repeating the message to the next module in the series for similar evaluation. When the module is reached that matches the address specified by the interface, a responsive routine is executed and the message is not passed further down the detector length. These initializing, addressing, and polling features that are passed through reporting and repeating modules are heretofore unknown characteristics in relative location detecting and reporting systems.

Referring now to specific embodiments of the linear relative location detecting and reporting system, additional benefits and advantageous features will be appreciated.

In one embodiment, a relative location detection apparatus including a detection unit having a support board having a plurality of spaced reed switches mounted along a lengthwise axis of the support board. Each of the reed switches has a longitudinal axis oriented substantially perpendicular to the lengthwise axis of the support board. A high intensity magnet is coupled to the support board for movement relative to the support board and in a direction substantially parallel to the support board's lengthwise axis. The magnet has north and south poles that are oppositely positioned to one another and directed toward one another across a width of the support board and into periodic alignment with the longitudinal axes of the reed switches. The magnet has a magnetic force sufficiently focused so that the magnet actuates the reed switches individually thereby indicating the magnet's location.

The magnetic actuation closes the reed switches and the magnetic force is sufficiently focused so that only one reed switch may be closed by the magnet at any one time. If so desired, however, two or three switches may be closed at one time to provide redundancy for increased reliability.

In at least one embodiment, a plurality of high intensity magnets are coupled to the support board for movement relative to the support board and in a direction substantially parallel to the support board's lengthwise axis.

In a further embodiment, there is at least one recess in the support board configured for receiving at least a portion of at least one of the plurality of reed switches within the support board. In one version of this embodiment, a plurality of elongate recesses in the support board, each elongate recess configured for receiving at least a portion of one of the reed switches within the support board below a switch-side surface of the board. In an enhancement, each of the elongate recesses is established by an aperture extending through the support board where the aperture receives a bottom portion of the reed switch thereby minimizing a distance between a longitudinal axis of the reed switch and a widthwise axis of the support board.

In one embodiment, the support board is sufficiently flexible to be bent into an arc along the board's lengthwise axis and so that the arc has a radius at least as short as one and one-half feet thereby accommodating a coiled configuration of the detection unit.

In still another embodiment, the support board is a printed computer circuit board and the elongate recesses in the circuit board have longitudinal axes oriented substantially perpendicular to the board's longitudinal axis thereby configuring the board for automated installation of the plurality of reed switches thereupon.

The detection unit has a plug end and an opposite plug receiving end for interconnecting a plurality of detection units into an end-to-end plugged series so that the series is capable of variable length which is determined by the number of detection units plugged together.

Each detection unit has a reporting and repeating module interconnected therewith for detecting closed reed switches actuated by the magnet and reporting the closed switch condition to a controlling interface for a plurality of the modules. Each of the reporting and repeating modules being capable of communication exclusively with adjacent modules in the plugged series thereby requiring information communicated along the series of detection units to be relayed through each interposed module that receives the information and repeats the information to a next module in the series.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

The beneficial effects described above apply generally to each of the exemplary devices and mechanisms disclosed herein of the relative location detection sensor. The specific structures through which these benefits are delivered will be described in detail hereinbelow.

BRIEF DESCRIPTION OF THE DRAWINGS

In the following, the invention will be described in greater detail by way of examples only and with reference to the attached drawings, in which:

FIG. 15 a is a partial cut away perspective view of the relative location detection apparatus in the form of a fluid interface sensor.

FIG. 16 is a cross-sectional widthwise view of the fluid interface sensor of FIG. 15 at a magnet carrier or float.

FIG. 17 is an exploded perspective view of the tubular housing of the sensor.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled"; this terminology's use contemplates elements being connected together in such a way that there may be other components interstitially located between the specified elements, and that the elements so specified may be connected in fixed or movable relation one to the other. Certain components may be described as being "adjacent" to one another. In these instances, it is expected that a relationship so characterized shall be interpreted to mean that the components are located proximate to one another, but not necessarily in contact with each other. Normally there will be an absence of other components positioned therebetween, but this is not a requirement. Still further, some structural relationships or orientations may be designated with the word "substantially". In those cases, it is meant that the relationship or orientation is as described, with allowances for variations that do not effect the cooperation of the so described component or components.

Figure 1:
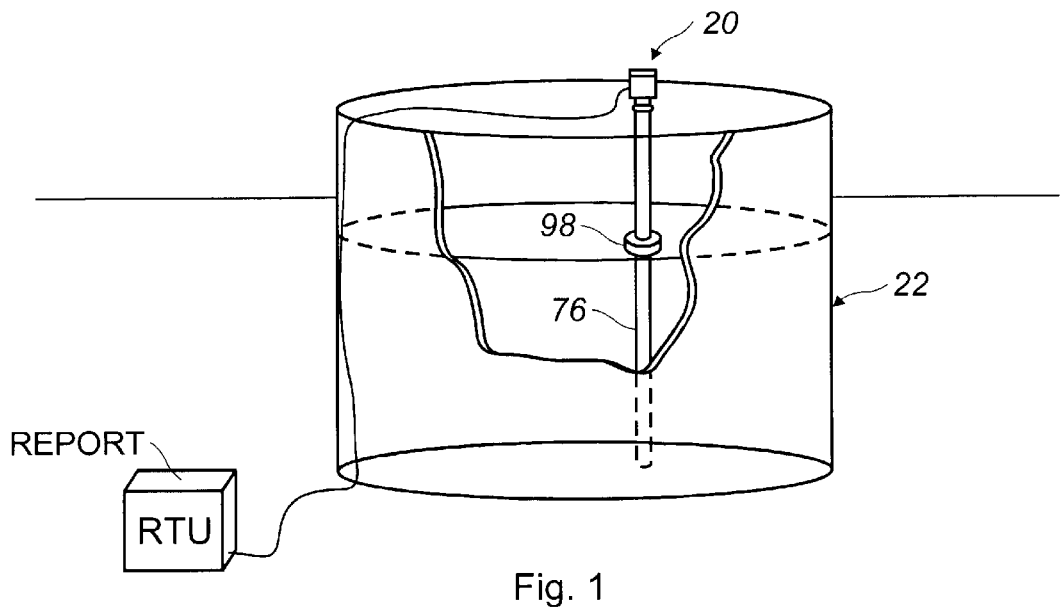
FIG. 1 illustrates the employment of the relative location detecting and reporting system of the present invention in an above ground liquid storage tank.
Figure 2:
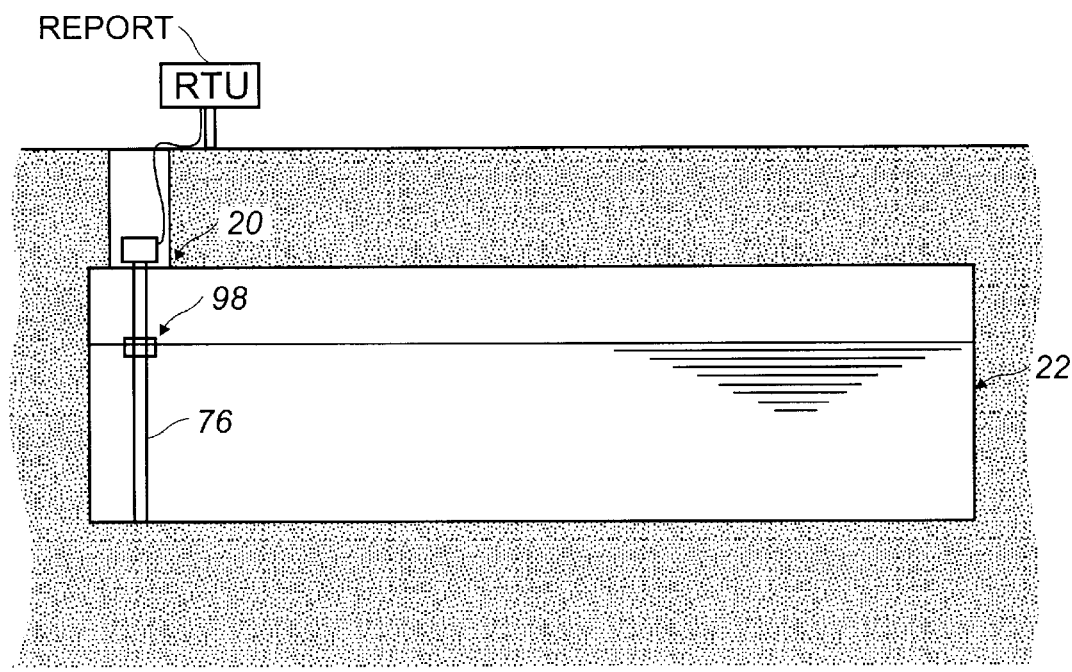
FIG. 2 illustrates the present invention installed in a subterranean reservoir.
Figure 3:
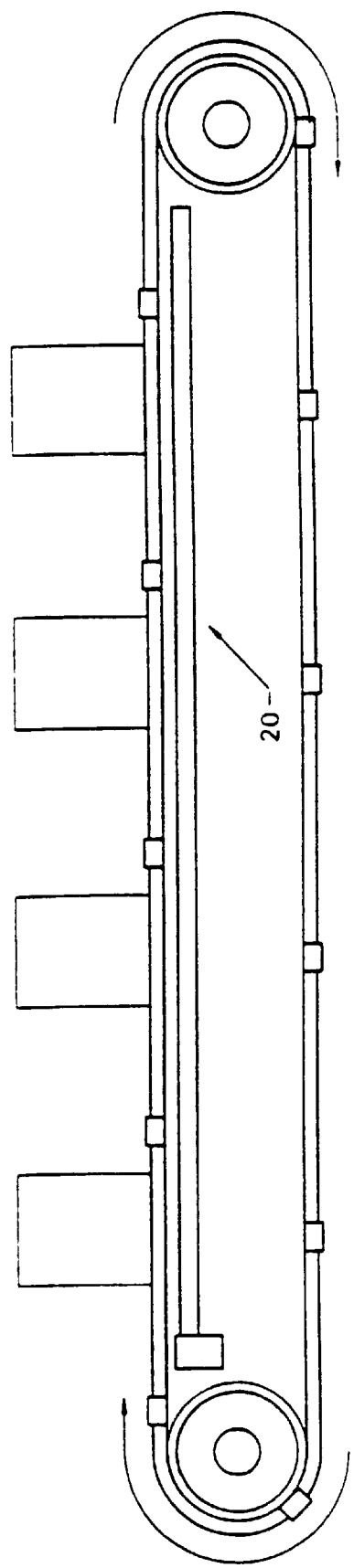
FIG. 3 illustrates the employment of the location detecting and reporting system of the present invention in a conveyor system of an assembly line in a manufacturing environment.

Referring to FIGS. 1–3, alternative applications and embodiments of the present invention are illustrated. As previously described, the present invention is a relative location detection apparatus, device or sensor 20 that is useable to sense and report the relative position of an indicator 90 relative to an elongate detection unit 40. FIG. 3 illustrates the employment of such a detection device 20 in a manufacturing environment wherein conveyor belt assemblies are utilized. In the example of FIG. 3, the elongate detection unit 40 is shown oriented parallel to the belt path of the conveyor. One or more indicators 90 may be placed either directly on the circulating conveyor belt for detection by the unit 40, or indicators 90 may be positioned in product which is conveyed upon the belt. In either case, the detection device 20 of the present invention may be used to detect the indicator's 90 position as it progresses through processing. One discrete detection may be made, or repetitive readings may be taken to establish a velocity of the indicator 90 relative to the elongate detection unit 40. Similarly, the repetitive readings recorded with respect to time may be used to calculate other such quantities as acceleration and future relative positions of the objects of concern. Though illustrated as having a straight and linear configuration, the detection unit 40 may have a curvilinear shape with a longitudinal axis configured either in two or three dimensions. Because of this versatility, substantially any path or variously shaped course may be monitored and reported upon. Because of the versatility afforded by the present invention, its utility may be exploited in most environments.

A preferred application for the relative location detection apparatus 20 is illustrated in FIGS. 1 and 2. In each, the relative location detection device 20 acts as a fluid interface detection device or sensor 20. As has been previously described, the present invention finds particular utility in measuring liquid levels in a fluid reservoir 22. FIG. 1 illustrates an above ground tank wherein fluids, most often in liquid form are retained. Common examples would be community and commercial water tanks. In industrial applications, similarly configured tanks are used to hold such fluids as crude oil, gasoline, and large quantity chemicals. In each situation, it is important that the owner and operator of the tank be able to detect fluid levels present therein and process that information for calculating such quantities as volume and rates of change indicative of the fluid being either input into or expressed from the tank. In certain situations, as when volatile fluids are involved, the head space or air content above the liquid is desirably minimized. To achieve this, some tanks have floating lids or covers that are maintained either at the top surface of the fluid or slightly thereabove. In either case, these floating covers rise and fall together with the quantity of fluid contained within the tank. In the example of FIG. 1, the fluid interface detection sensor 20 stands substantially upright in the fluid contained within the tank so that the entire height of the fluid may be monitored.

As will be described in greater detail hereinafter, an indicator 90 in the form of a high intensity magnet 90 is slidably engaged upon a liquid impermeable tubular housing 76 which forms an encasement for at least the elongate detection unit 40. The sensor 20 has capabilities for not only monitoring the fluid level present in the tank, but also employees means by which that information may be communicated to a remote terminal unit (RTU) for recording, processing, and potentially transmission to yet another receiving station for evaluation.

It is contemplated that one or more fluids may be contained in a tank similar to that shown in FIG. 1. Multi-phase fluid reservoir tanks are often encountered in the petroleum industry. One example would be the production of a subterranean well that is either pressured or pumped above the ground's surface and reservoired in a tank. As this production is allowed to stand in the holding tank, its constituent components may separate into separate fluid phases. An exemplary situation may include several liquid phases wherein the lower and heavier may include water with an intermediate phase of heavy crude and an upper liquid phase of light crude above the rest. Still further, a gaseous phase may be contained above the fluids thereby producing a multi-phase continuum comprising at least the two liquid and gaseous states. The separation of the different components is based on their various densities and therefore fluid interfaces are established where these densities change. Knowing these approximate densities permits the manufacture of various density floats 98 that will "ride" at a particular interface. It is even possible that solid sediment that settles to the bottom of the tank may be monitored by an appropriately configured and selected float 98 having an indicator 90 incorporated therein.

In a preferred embodiment, the float 98 includes a magnet carrier within which a high intensity magnet is carried. By operating the sensor 20 at any given time, a fluid level within the tank my be taken. Subsequent readings may be taken to determine changed levels within the tank and depending upon the frequency of the taking of two or more readings, it is possible to determine the rate of rise and fall of the fluid level within the tank. The accuracy of such information will depend primarily upon the resolution or distance between possible readings on the elongate detection unit 40 and the frequency at which consecutive readings are conducted. By minimizing each, a high degree of accuracy and resolution may be achieved with respect to instantaneous level readings, as well as rate of change calculations derived from sequences of readings. As previously described, the present invention incorporates means by which this read information can be processed and communicated for remote evaluation and analysis. Based on this information, operator action may be taken with respect to the monitored situation. In the case of oil well effluent tank, this action may include emptying a nearly full tank when requisite conditions are sensed.

FIG. 2 illustrates an alternative, but similar embodiment to that shown in FIG. 1. Instead of being above ground, however, a fluid confining tank is located below ground where level readings may be potentially even more difficult to obtain. Similar sensing apparatus of the present invention as described hereinabove are utilized in such tanks, with sensed information being reported to an above ground RTU for recording, processing, and potentially remote transmission.

The fluid interface detection device 20 of the present invention may be employed without the benefit of a holding tank for fluid. As in the subterranean environment of FIG. 2, the sensor 20 may be installed directly into a subterranean formation in a receiving cavity provided therefore. The sensor 20 may also be utilized above ground in a similarly unrestrained environment such as in a flood plane where rising and falling flood waters are desirably monitored. Because of the potentially dangerous situations surrounding any of the above described monitored situations, the remote reporting capabilities of the present invention are highly desirable from a reduced risk to personnel perspective.

In the environments described hereinabove wherein the fluid interface detection sensor 20 is employed, fluids normally in liquid form are present that would detrimentally affect the operation of the sensor 20 if permitted to invade the inner-workings of the several components, and primarily the detection unit 40. Not only might the fluids be corrosive and otherwise degrading to the sensitive components, but as liquids they will also prevent electronic and electrical devices from operating appropriately, if at all. Therefore, a protective housing 76 for these sensitive components of the detection unit 40 must be provided. It is also required that the fluid level position be communicated across such a housing 76. The construction of such a housing will be dictated primary by the characteristics of the fluids within which the sensor and housing are to be immersed, but also by the mode in which fluid level information will be communicated thereacross. In the embodiments disclosed and described herein, the fluid indicator 90 takes the form of a high intensity magnet 90 that influences discretely positioned reed switches 64 within the housing 76 and from which electrical readings may be taken to determine where a particular fluid interface of interest occurs.

The use of fiberglass for constructing such a liquid impermeable tubular housing 76 has been advantageously selected. The characteristics of fiberglass permit a tubular body to be readily formed that is easily sealable thereby establishing the liquid impermeable tubular housing 76 that may be immersed within a fluid reservoir 22. The characteristics of fiberglass make it particularly useful in the housing's 76 construction. It is easily moldable into various shapes and hardens into a rigid encasement that not only prevents liquid invasion, but will also physically protect contents placed therein. Still further, fiberglass readily receives a variable array of epoxies and glues which may be used to adhere additional components to the tubular housing 76 or connect a plurality of sections of tubing into one unitized housing. One such possible configuration is shown in FIG. 17 wherein one end of a tubular section may be tapered from an exterior surface toward an interior surface forming a male type connection to be matingly engaged with a female type connection wherein a flare is oppositely affected from the interior surface outwardly toward the exterior surface. In this way, the two sections may be mechanically engaged in an end-to-end configuration and bonded together. Various epoxies may be advantageously employed for such bonding. Still further, other components such as guides 78 utilized for maintaining the rotational relationship of the indicator magnet 90 about the housing 76 may be similarly fixed and bonded to the housing's 76 exterior surface. As is illustrated in FIGS. 15 and 16, the guides 78 establish elongate "keys" along the length of the exterior surface of the housing 76 for mating engagement with a receiving "key hole" within the carrier 91 of the float 98 for preventing rotation of the indicator magnet 90 about the housing 76.

Figure 4:
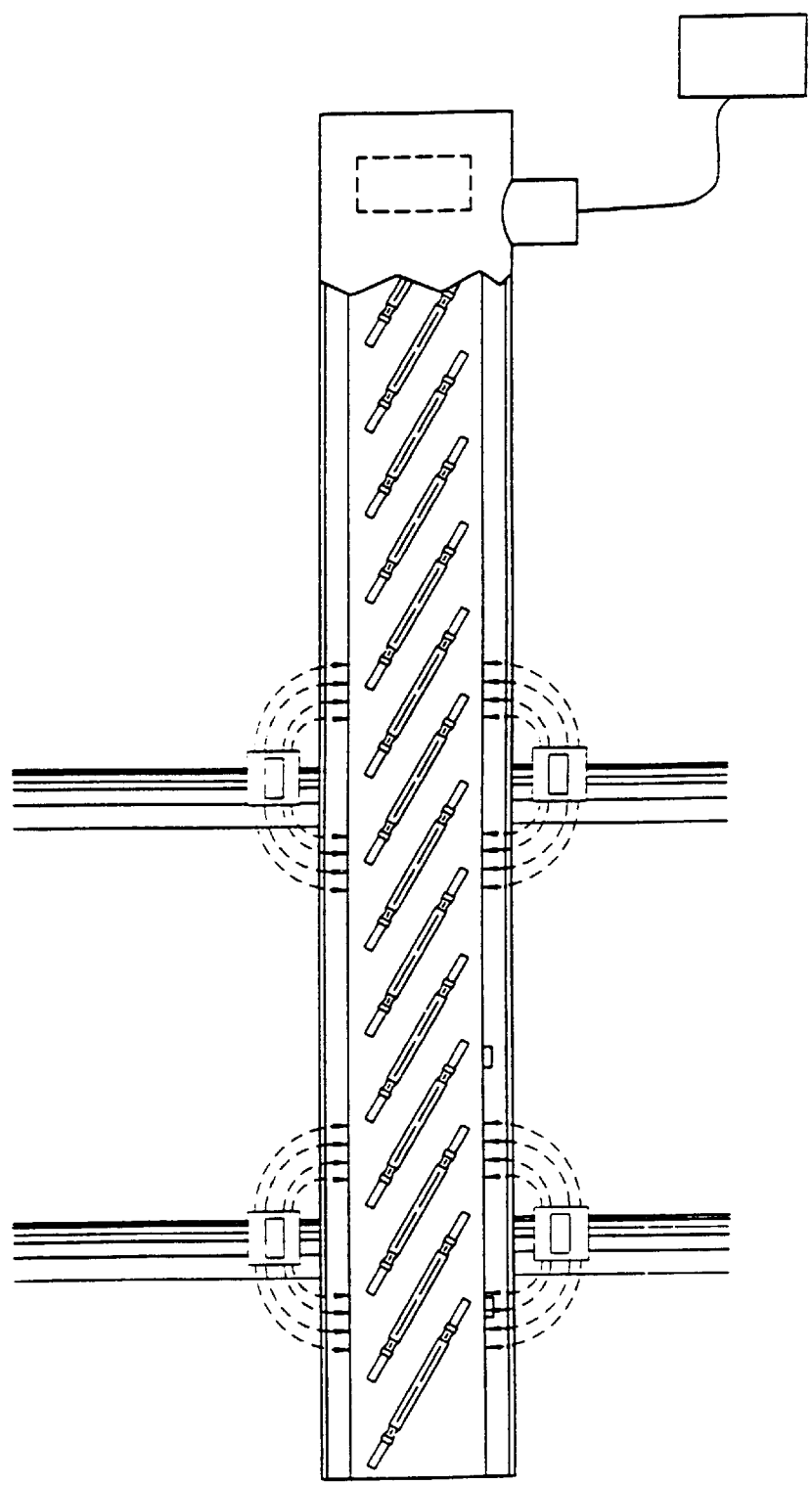
FIG. 4 illustrates a prior art liquid level measuring apparatus for use in multi-phase liquids having an angled switch orientation.

The interior space of the tubular housing 76 is provided primary for the protection of the elongate detection unit 40. As discussed hereinabove, known liquid level measuring apparatus have been and are presently used for detecting fluid levels in environments similar to those shown in FIGS. 1 and 2. These known devices, however, have limitations and constraints imposed by their designs and the constituent components employed therein. Furthermore, these known sensor's employment has not been trouble-free, and therefore the present relative location detection device 20 has been invented. For comparison purposes, an example of one of these prior art sensors is illustrated at FIG. 4.

For reasons described hereinabove, reed switches were placed on a back board at substantially angled orientations to horizontal. That orientation was required to accommodate the cancellation effect of each sensor and the overlapping relationship required to achieve sufficiently fine resolution in level readings. Readings were achieved through the use of one or more toroidal magnet's sliding movement along the sensor housing that indicated a fluid interface proximate to the magnet's carried position. Because of the toroidal magnet's surrounding of the housing and its uniform influence thereabout, rotation of the magnet about the exterior of the housing was without influence and therefore unrestrained. The highly disbursed magnetic force induced by the magnet influences multiple overlapping reed switches at any given time. As a result, a refined location of the toroidal magnet, and in turn the fluid level about the sensor, is computed and extrapolated from the group of several switches that are closed in response to the magnet at the time of reading. Because this information must be processed to establish the location of the toroidal magnet and the corresponding fluid level, this method of measurement is considered indirect or implied. This should be contrasted to the discrete readings provided by the present relative location detection device 20 and the direct and express level reading permitted thereby.

Figure 7:
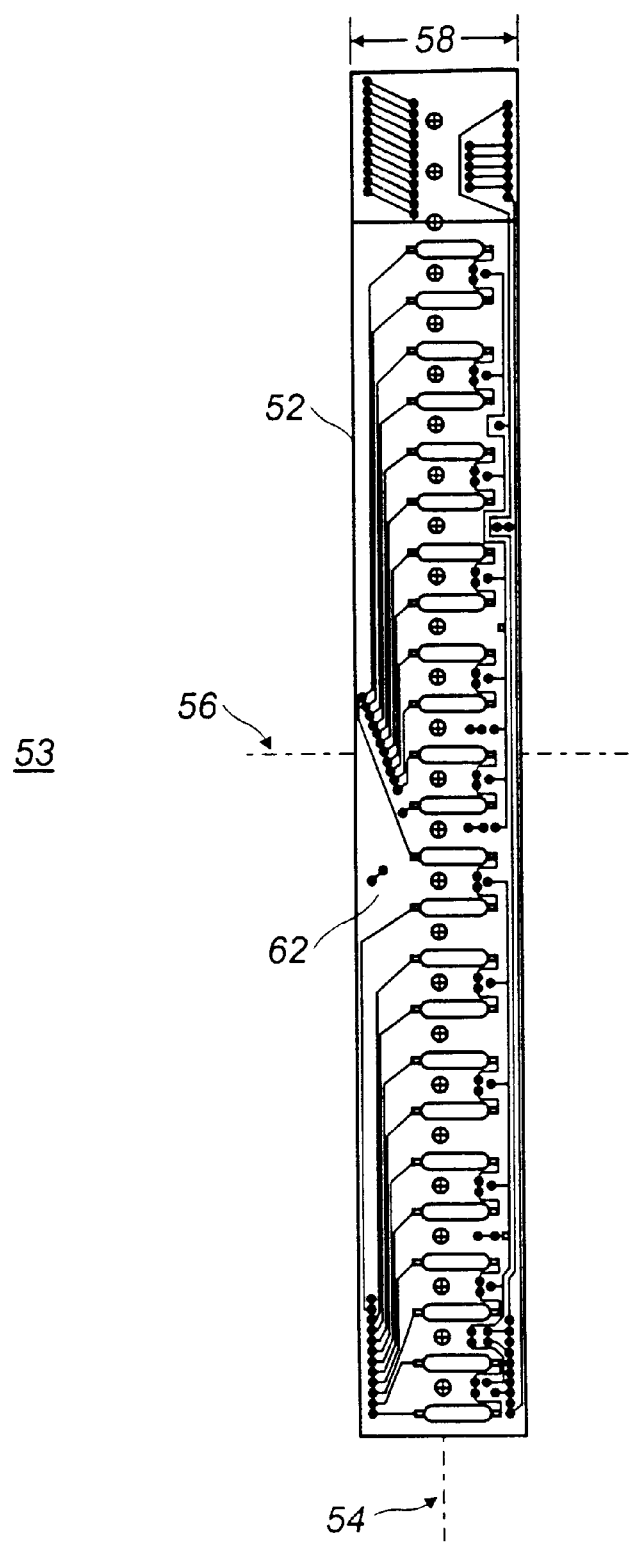
FIG. 7 illustrates the horizontal orientation of the reed switches of the present invention on a single panel of a detection unit.

Referring to FIG. 7, one panel 53 portion of a support board 52 is illustrated. Reed switches 64 are shown mounted upon the support board 52 in a substantially horizontal orientation. This horizontal orientation removes the necessity of overlap between adjacent switches 64. Instead of having to depend on a resolved location of the indicator's 90 position, a direct reading may be taken from a single reed switch 64 or detector which is individually closed while adjacent switches 64 on either side of that closed switch 64 remain open and uninfluenced by the magnet 90. The degree of accuracy of level readings may be increased by reducing the sequential spacing between the series of reed switches 64.

Figure 5:
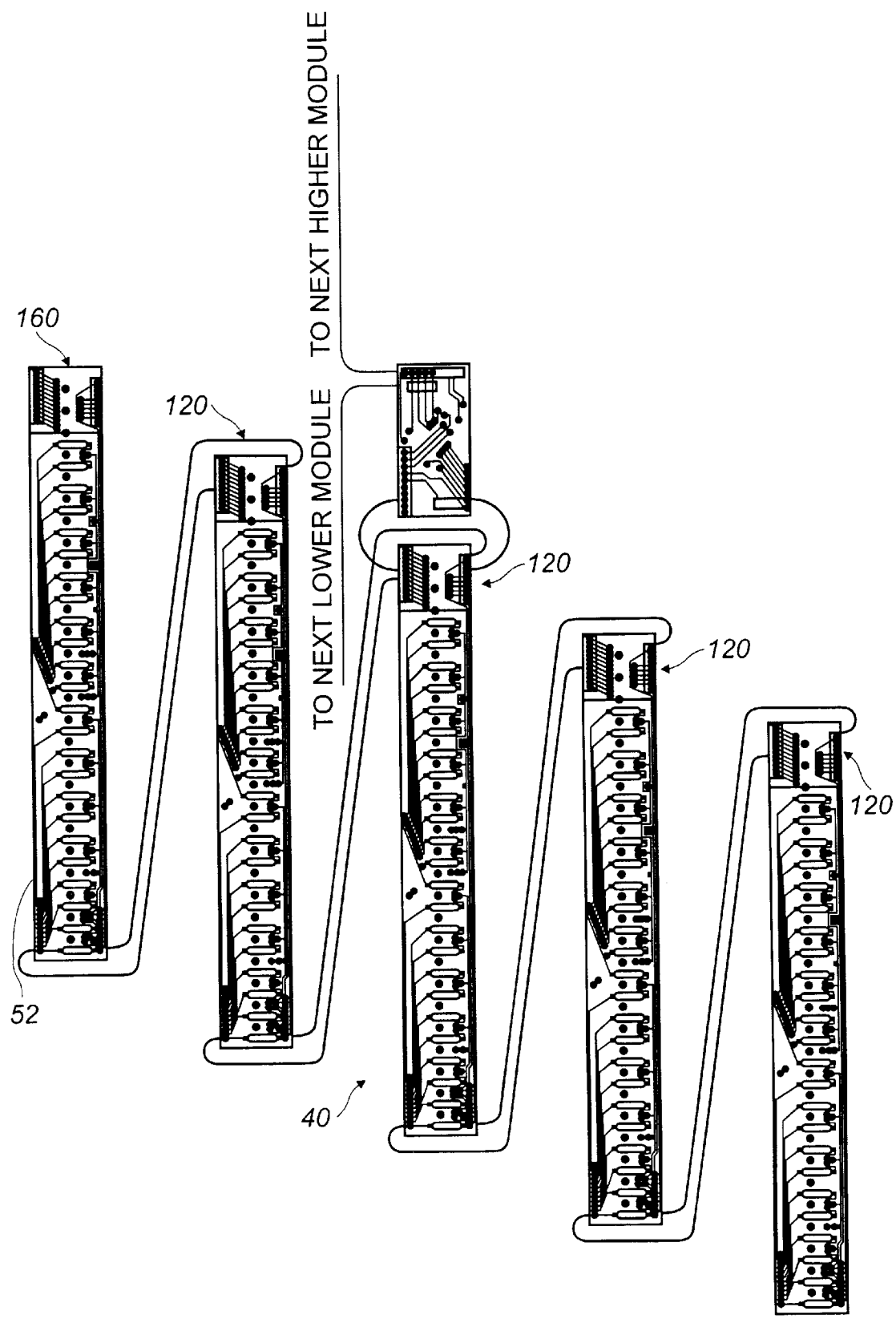
FIG. 5 illustrates a one hundred and twenty reed switch module detection unit of the present invention.
Figure 18:
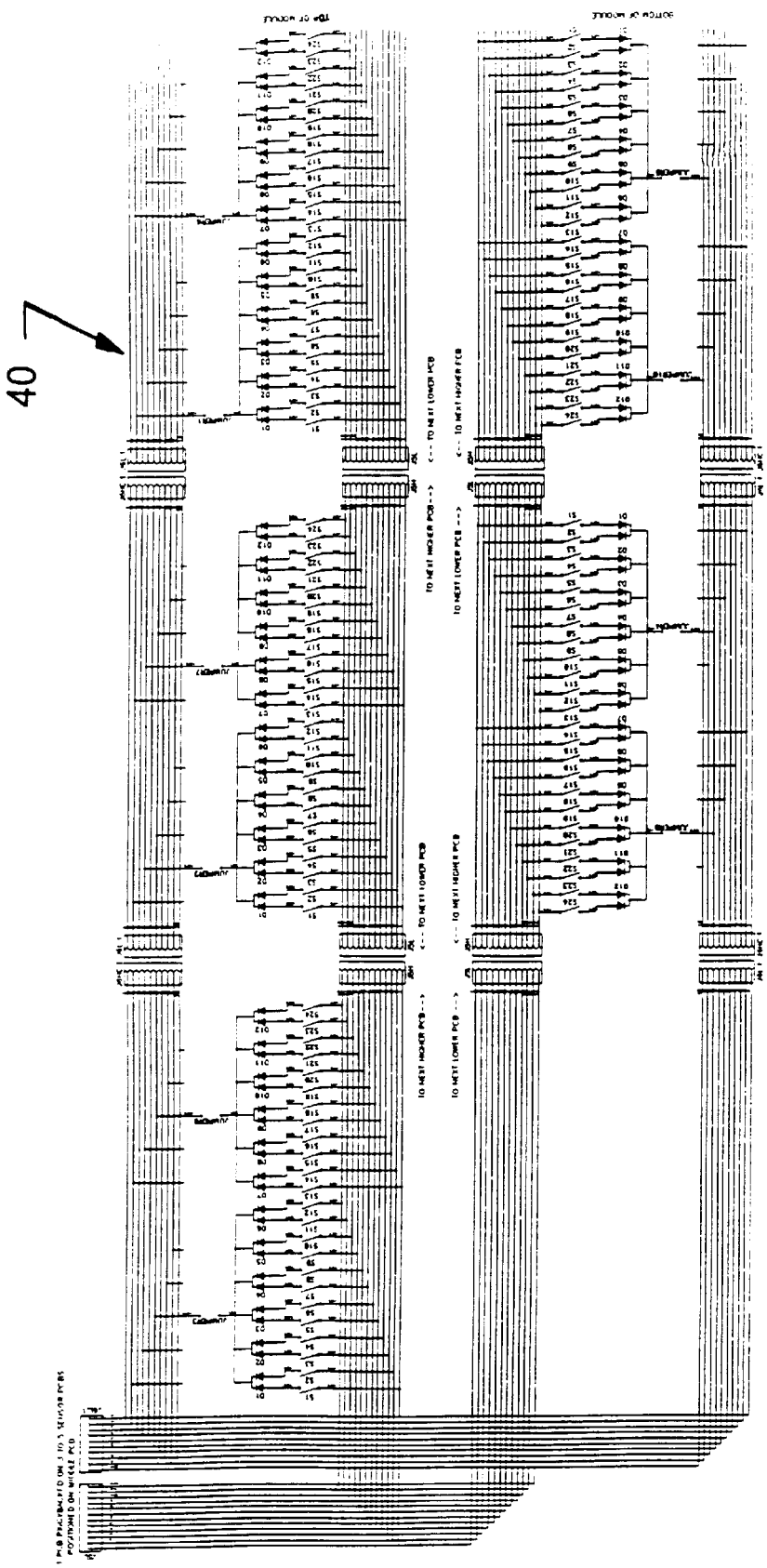
FIG. 18 is an electronic schematic of the jumpered connections of a 120 switch module.

To facilitate manufacture of the support board 52, individual panels 53 are constructed from printed computer circuit board in relatively short one foot lengths for ease of manufacture and transport. These individual panels 52, as illustrated in 7, are then connected into module lengths that may include any number of individual panels connected in end-to-end configurations. In a preferred embodiment, as many as five panels 53 are joined together to form a modular support board 52 as illustrated as illustrated in FIG. 5. Because of design criteria described hereinbelow, each modular support board 52 includes a maximum of one hundred and twenty reed switches carried thereon and controlled and monitored by a reporting and repeating module 120. As is illustrated in the switch wiring schematic for one module support board of FIG. 18, the individual reed switches 64 are connected by jumpers in a 10×12 matrix in a preferred, but not exclusive embodiment. Through the matrix, and as will be described in greater detail hereinbelow, the closed or opened status of each individual switch 64 within a one hundred and twenty switch module maybe ascertained.

Referring again to FIG. 18, the matrix is shown as a group of twelve connections and a group of ten connections. Each switch 64 of a set of twelve switches may be jumpered to one of the twelve wire set. That twelve switch set is then tied together and jumpered as a set to one of the ten wire set. In this manner, one hundred and twenty different possible combinations are made possible and through which it is determinable on an individual basis which switch 64 or switches 64 are closed under the influence of an indicator magnet 90.

The closed switch information is gathered by the reporting and repeating module 120 which oversees operation of the particular one hundred and twenty switch module. Each module 120 reports to and is controlled by a controlling interface 160. These several modules 120 and the single controlling interface 160 will be described more specifically hereinbelow. At this juncture of the description, however, it is important to appreciate that together these components govern polling for reportable information and collecting the same and transmitting it for processing into meaningful data. Among others, additional information may be sensed such as temperature conditions external to the liquid impermeable tubular housing 76 and reported either in addition to closed-switch level information, or alternatively thereto.

Referring back to FIG. 7, a single panel 53 of printed computer circuit board is shown with connections at each end for attachment to an adjacently positioned and similar panel 53. The support board 52 is shown as having a lengthwise axis 54 that in the illustrated standing configuration is substantially vertical in orientation. A widthwide axis 56 of the board 52 is oriented perpendicularly to the lengthwise axis 54 and therefore is substantially horizontal in the illustrated embodiment. The widthwise access 56 extends across a width 58 of the support board 52. The support board 52 has two oppositely opposed surfaces. One is a switch side surface 62 to which the reed switches 64 are connected and the opposite surface is a wire through surface 63 upon which transmission connections are affected between individual panels 53 of the support board 52. It is at the switch side surface 62 that the jumper connections between each individual switch 64 and the twelve switch set is affected into the preferred 10×12 wiring matrix.

Figure 6:
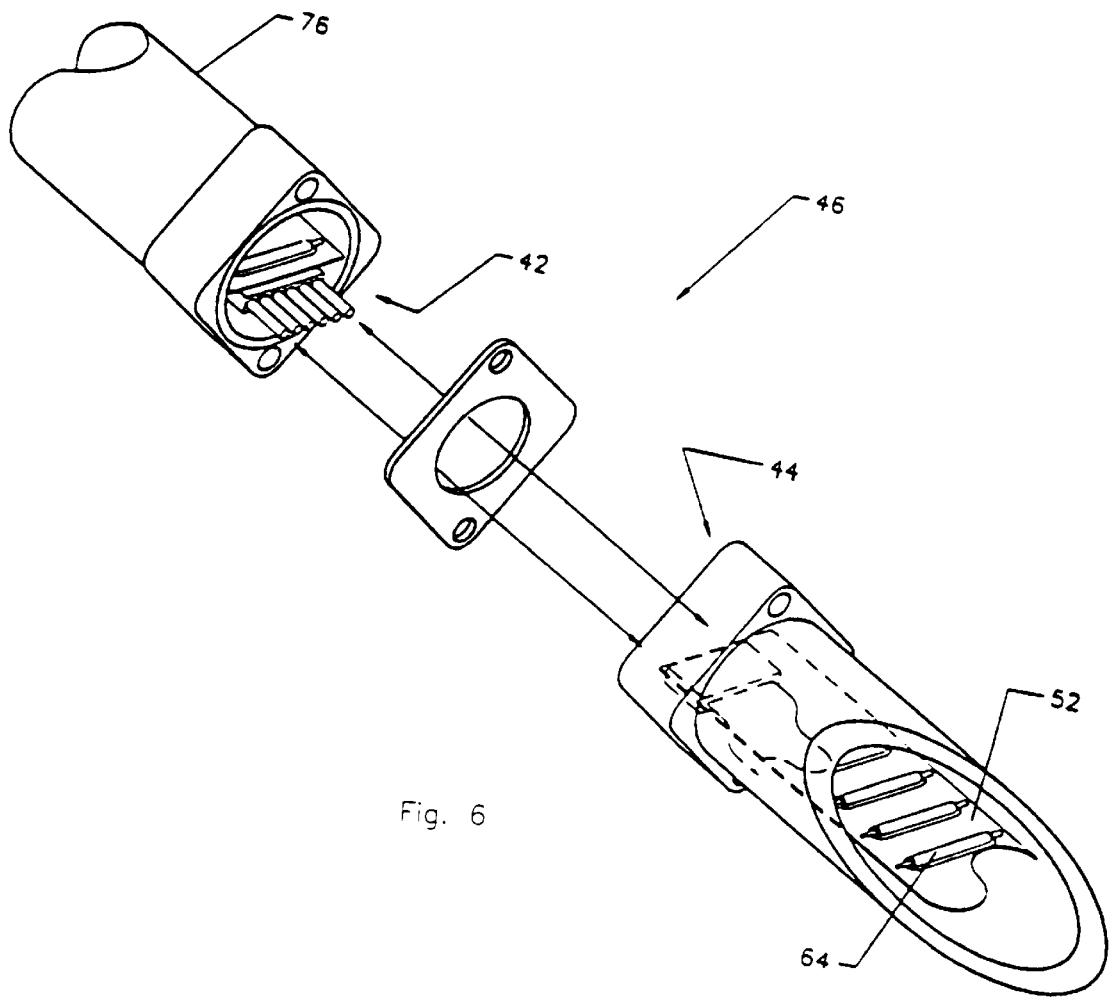
FIG. 6 illustrates the plugable end configurations of a detection unit module.

Each reed switch 64 is attached to the support board 52 by fixing leads 70 at each of the two ends of the switch 64 to the switch side surface 62 while making simultaneous electrical connections into the 10×12 wiring matrix. The reed switches 64 of the present invention are of conventional construction in that each includes two reeds extending toward one another so that a short distance of overlap is achieved, but with a slight distance therebetween. The two reeds are fixed in this orientation and protected by an encasement. Leads 70 extend outwardly from the encasement from each of the two reeds. Details of the reed switches 64 configurations may be observed in the illustrations of FIGS. 5 and 6. With respect to the present invention, each reed switch has a longitudinal axis 66 that is oriented substantially horizontally and parallel to the widthwise axis 66 of the support board 52. As previously mentioned, this orientation is in stark contrast to the angled orientation in previous sensors variously illustrated in FIGS. 4, 8, and 11.

Figure 8:
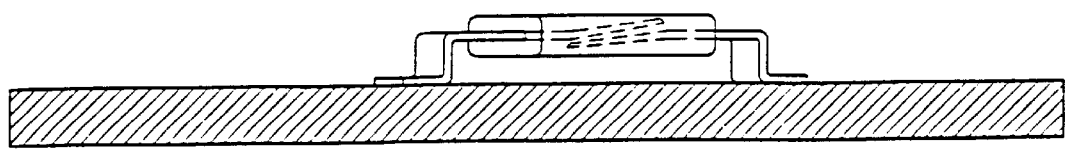
FIG. 8 illustrates a widthwise view of a reed switch mounted upon a back board of a prior art measuring apparatus illustrated in FIG. 4.
Figure 11:
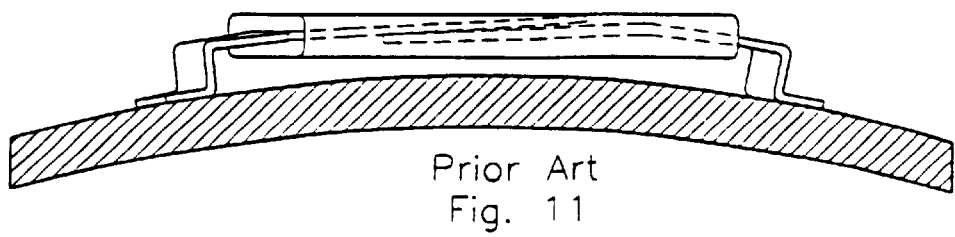
FIG. 11 illustrates a lengthwise view of a reed switch mounted upon a bent back board of a prior art measuring apparatus illustrated in FIG. 4.
Figure 12:
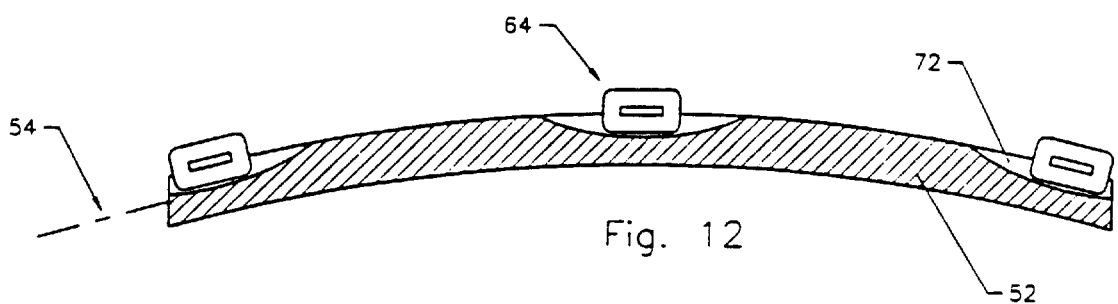
FIG. 12 illustrates a lengthwise view of a reed switch of the present invention mounted in a recess in a bent support board.
Figure 13:
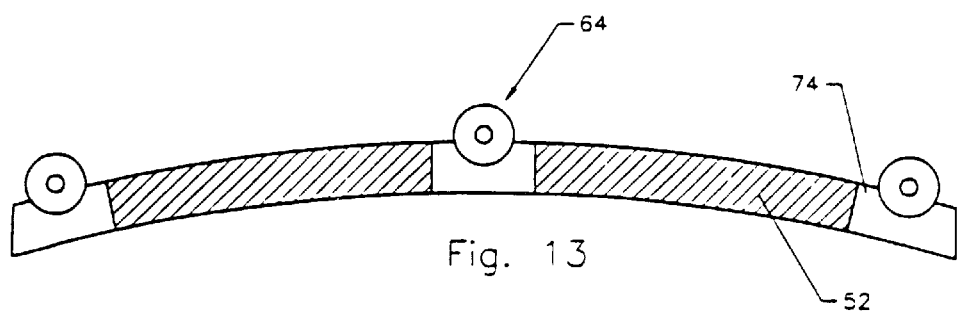
FIG. 13 illustrates a lengthwise view of a reed switch of the present invention mounted in an aperture through a bent support board.
Figure 14:
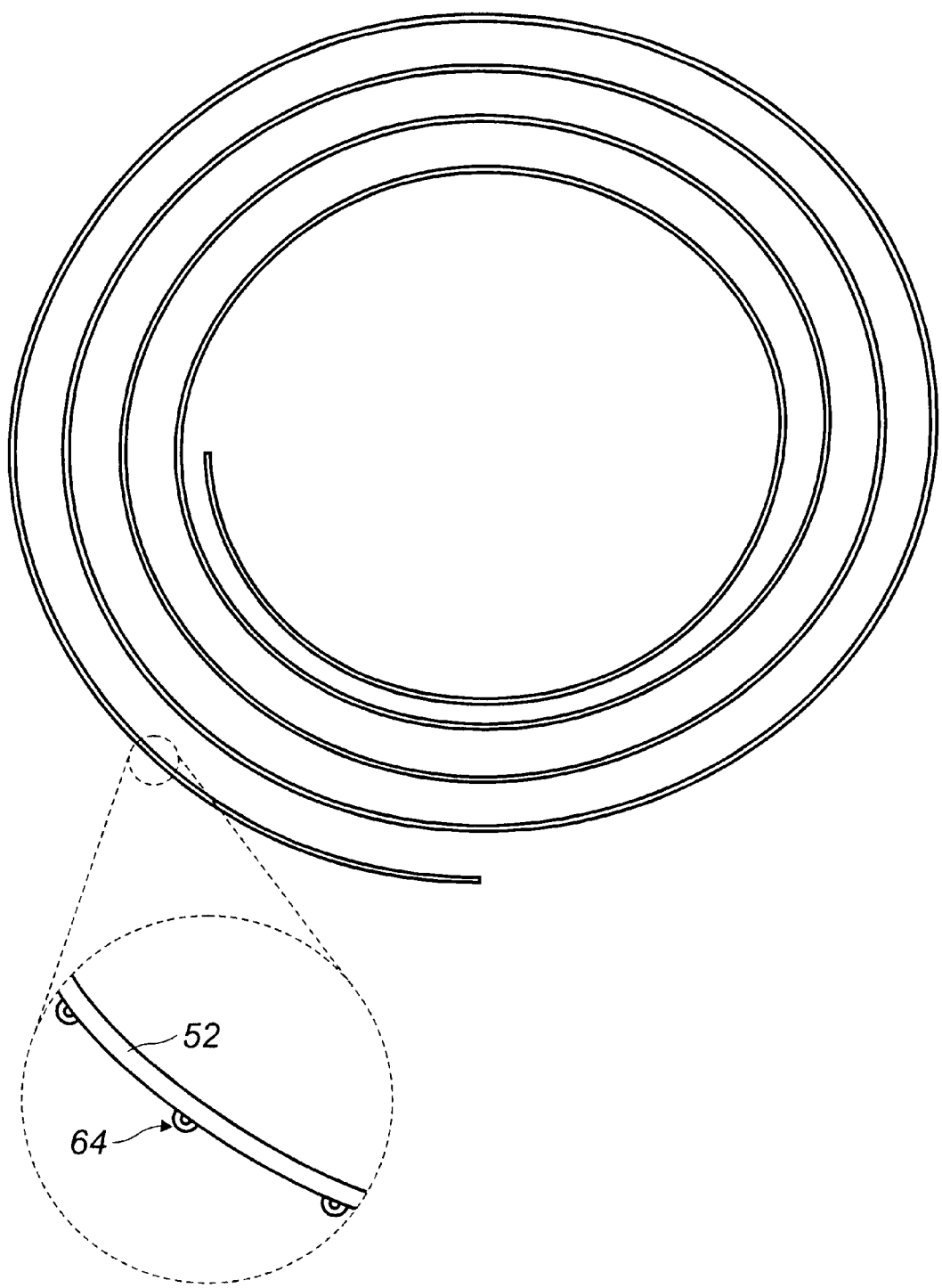
FIG. 14 is a side-view of the detection unit in a coiled orientation.

As has been previously explained, the angled orientation of the reed switches of prior sensors resulted in detrimental consequences when the back boards were flexed. As is illustrated in FIGS. 8 and 11 that are illustrative of the prior art, a flexing of the back board along its lengthwise axis resulted in deformation of the individual reed switch and an altered orientation of the opposingly oriented reeds. This often prevented proper operation of the reed switch which later failed to appropriately respond to the toroidal magnets passing thereabout. To alleviate this effect of flecture of the support board 52 on the switches 64, the switches 64 have been horizontally oriented in the present invention so that they are substantially perpendicular to the lengthwise flection. That is, now that the leads 70 and reeds of each switch 64 are parallel to one another across the support board's 52 width 58, and not at different positions with respect to the length of the board, the twisting and bending effect between the two ends is removed. This superior configuration is best appreciated in the series of FIGS. 11–13.

Figure 9:
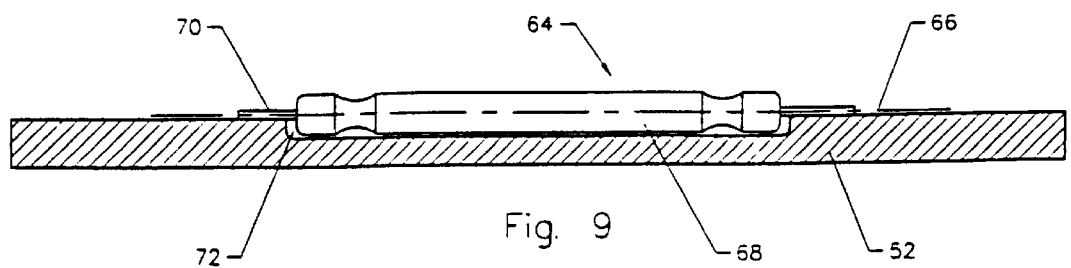
FIG. 9 illustrates a widthwise view of a reed switch of the present invention mounted in a recess in the support board.
Figure 10:
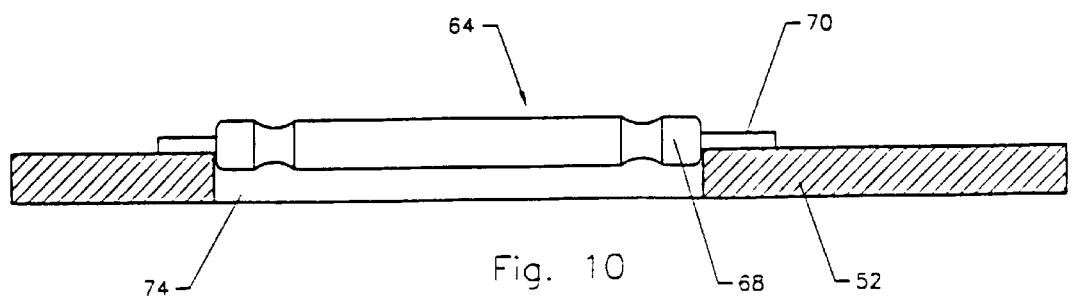
FIG. 10 illustrates a widthwise view of a reed switch of the present invention mounted in an aperture through the support board.

The elevated position of the prior art reed switch above the back board as illustrated in FIG. 8 has been discovered to result in undue stresses to the switch, particularly at the right angles caused in the lead resulting from the upwardly extending portions that must then divert inwardly toward the reeds and the encapsulating housing. The need for such right angles and elevation above the switch-side surface 62 of the board 52 has been alleviated by providing a receiving area within the board for a bottom portion 68 of the switch. This accommodation may be affected by including a recess 72 into the surface 62 as illustrated in FIG. 9 or alternatively by the provision of a through aperture 74 as shown in FIG. 10. In either case, a cavity or evacuated area is provided within the body of the support board 52 for receiving a lower or bottom portion 68 of the switch 64 therein. This permits the leads 70 of the switch 64 to project directly out of the protective housing about the reeds and be connected directly to the switch-side surface 62 of the board 52. As may be clearly appreciated in FIGS. 9 and 10, this alleviates the right angle previously required in the leads of the switch and places the longitudinal axis 66 of the switch 64 substantially coincident with the switch-side surface 62. Through the discovery of these improved orientations, substantial stress is prevented from being imposed on the switch 64 during flexion of the support board 52. Much of this stress reduction is attributable to the reduction in distance between that longitudinal axis 66 of the reed switch 64 and the widthwise axis 56 of the support board 52. By drawing these two axis 56 and 66 closer together and placement of the switch 64 in a horizontal orientation across the width 58 of the support board 52, little or no twisting or torque results in the switch 64 as a result of lengthwise bending of the board 52. As a further benefit, the recess 72 and aperture 74 within which the portion of the switch 64 may be received acts as a protective cradle shielding and protecting the delicate switch 64 from mechanical interference.

As has been described herein, several circuit board panels 53 are connectable into the support board 52 upon which a maximum of one hundred and twenty reed switches may be incorporated. It would be possible to hard wire consecutive modules onto an extended support board forming an entire detection unit 40, but this type of construction would require that each sensor 20 be individual constructed based on its specified length. The present invention modularize each individual support board unit 52 so that each terminates in a plugable end that facilitates and makes possible end-to-end connection of a plurality of boards 52. Because the number of connections between each board section 52 has been minimized as will be described in greater detail hereinbelow, and the fact that that number is fixed regardless of the overall length of the sensor 20, each connection is identical between the several support boards 52 that make up the detection unit 40.

The horizontal orientation of the several reed switches 64 on the support board 52 is in part made possible by the incorporation of the high intensity magnet 90 in place of the lessor strength toroidal magnet. The high intensity magnet 90 has a focused magnetic force 96 that is directed across the detection unit 40 in line with the longitudinal axis 66 of the reed switches 64 from opposingly oriented north 92 and south 94 poles of the magnet 90. The contrast in effect is best appreciated in the illustrations of FIGS. 4 and 7. Because of the focus of the magnetic force field 96, it is possible to actuate only one of relatively closely spaced switches 64 in a series down the support board 52. In a preferred embodiment, the greater strength of the magnet 90 is at least in part attributable to the inclusion of the material neodymium as a constituent component in the high intensity magnet 90. As a result, a greater magnetic charge is possible upon the magnet 90 of sufficient strength to actuate or close the horizontally oriented reed switches 64 having comparatively smaller leads 70 and requiring greater magnetic influence for closure. Because of the focused natured of the magnetic force 96 of these high intensity magnets 90, it is required that their orientation be maintained so that the force 96 is directed across and substantially in line with the longitudinal axis 66 of the reed switch series 64. Therefore, the guided configuration of the magnet carrier 91 in the form of the float 98 in at least one embodiment is illustrated in FIGS. 15 and 16 to incorporate the guides 78 upon the tubular housing 76. As discussed earlier, these guides 78, as well as others alternatively configured will act to prevent the magnet's 90 rotation about the housing 76 while simultaneously facilitating sliding movement along the length of the housing 76 and detection unit 40.

Figure 19:
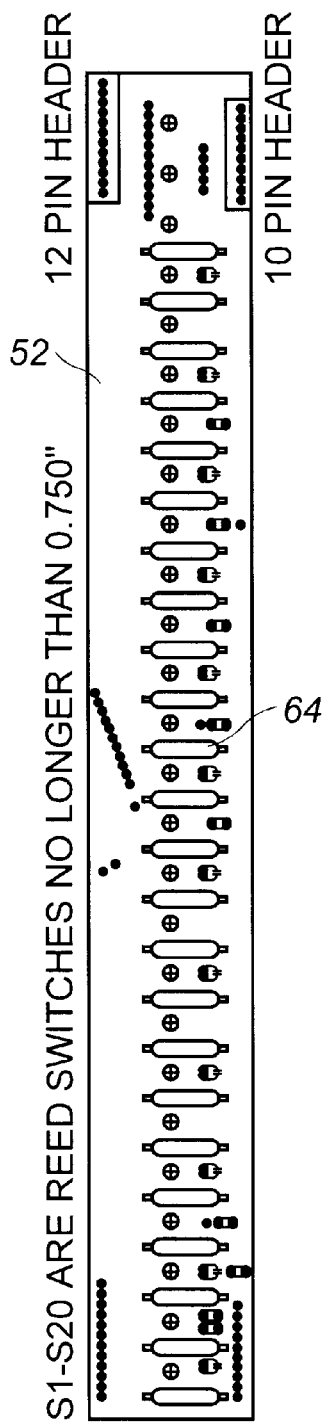
FIG. 19 is a layout schematic for a switch receiving panel of a module unit.
Figure 20:
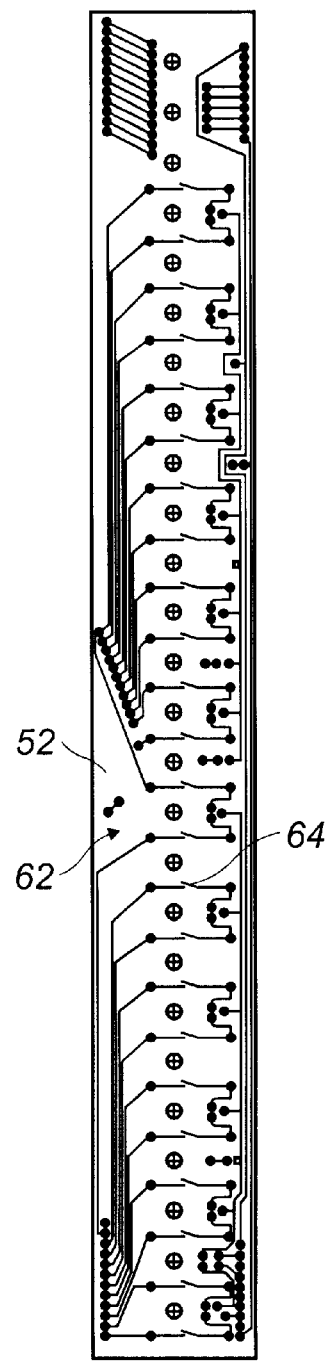
FIG. 20 is an electronic schematic of the front or switch-side surface of a switch receiving panel of a module unit.
Figure 21:
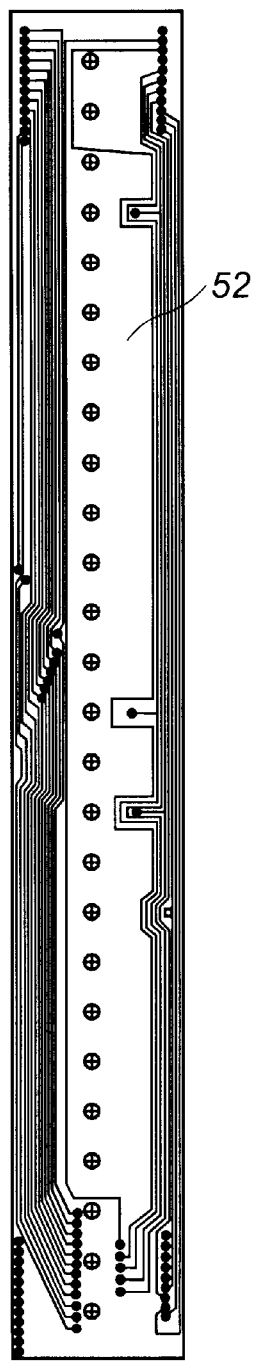
FIG. 21 is an electronic schematic of the back or cross-panel communication side surface of a switch receiving panel of a module unit.
Figure 22:
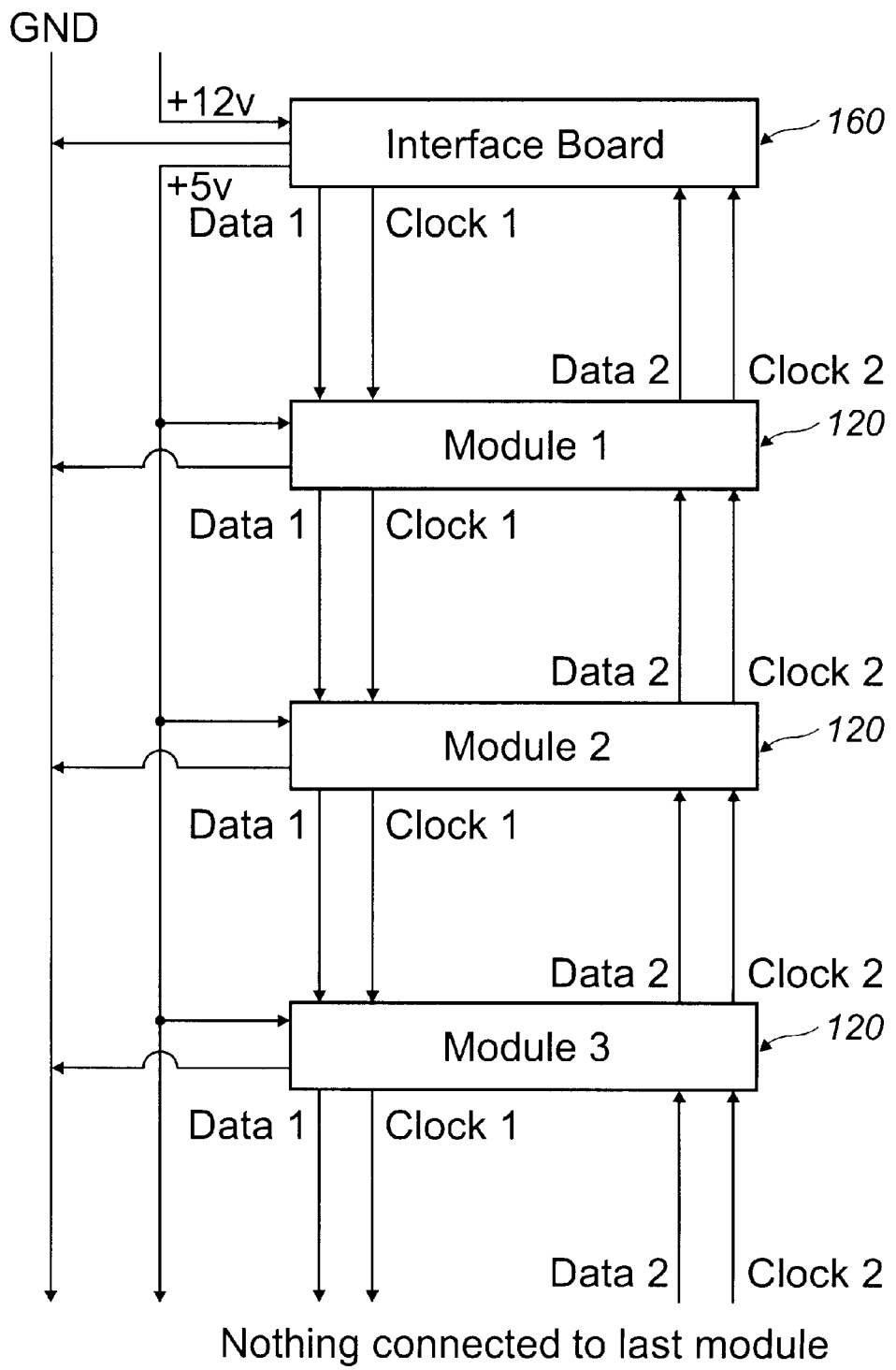
FIG. 22 is a schematic of module units connected to a controlling interface.
Figure 23:
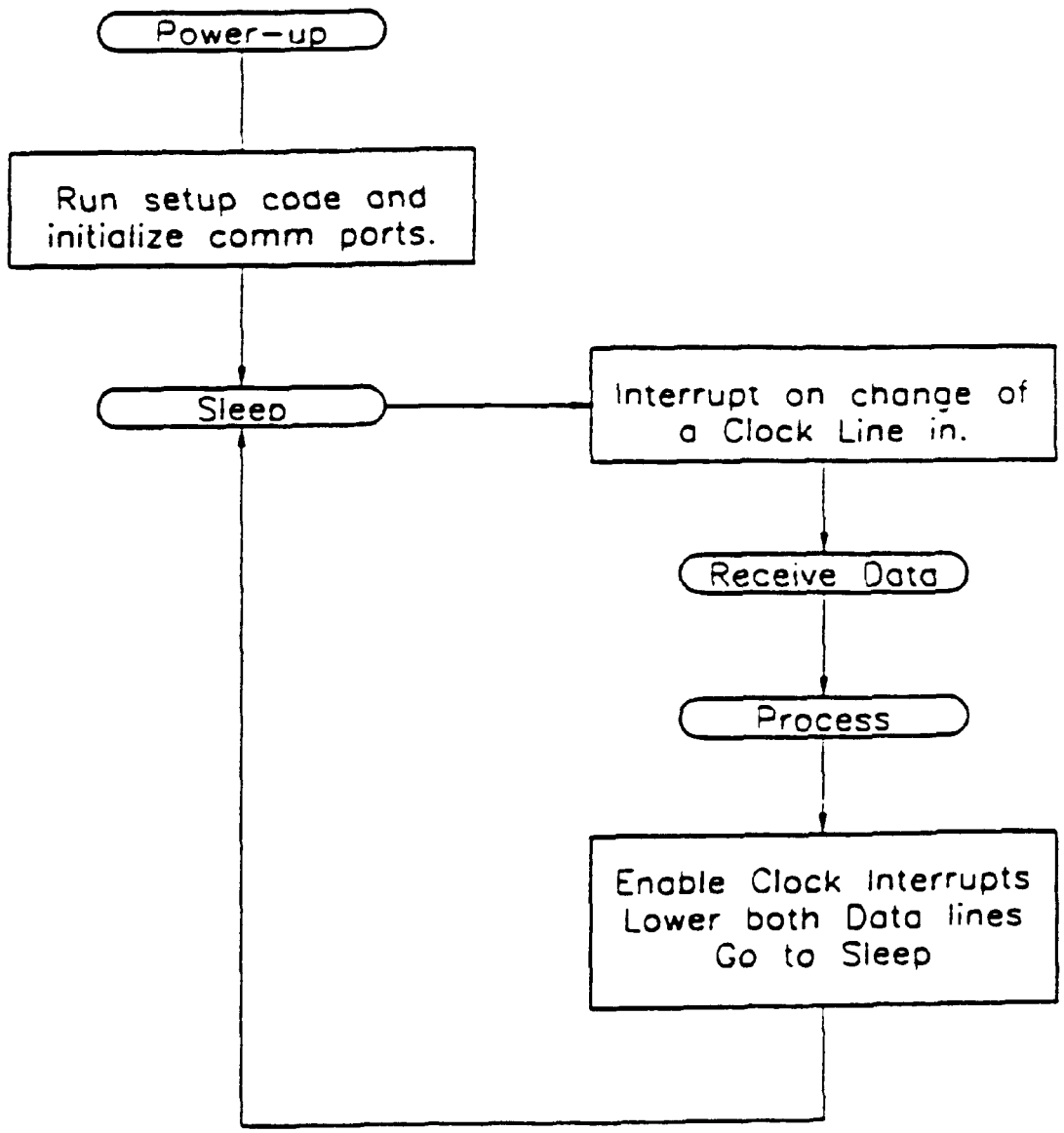
FIG. 23 is a flow chart illustrating the start-up procedure of the sensor.
Figure 24:
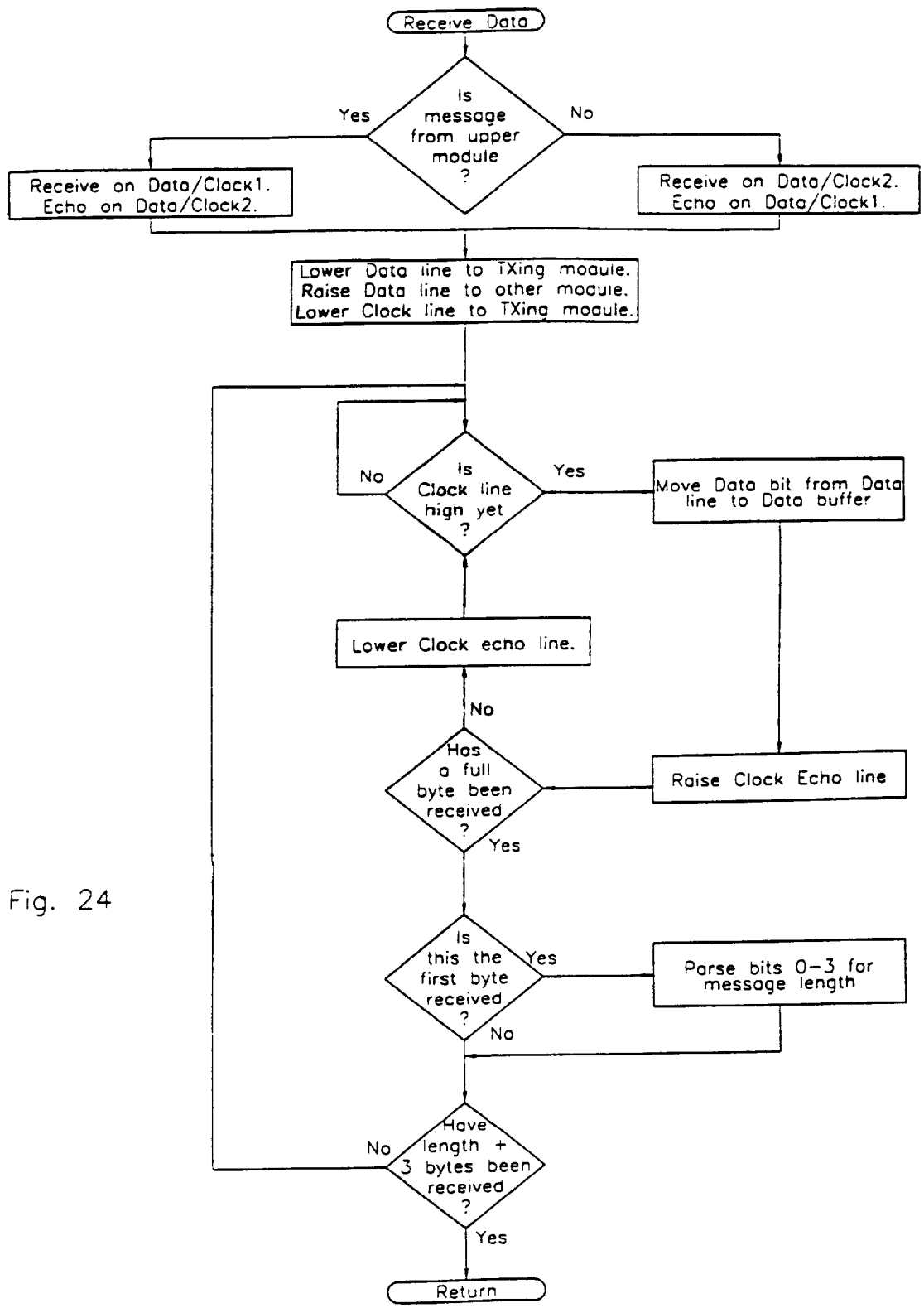
FIG. 24 is a flow chart illustrating the procedure for receiving data in a module unit.
Figure 25:
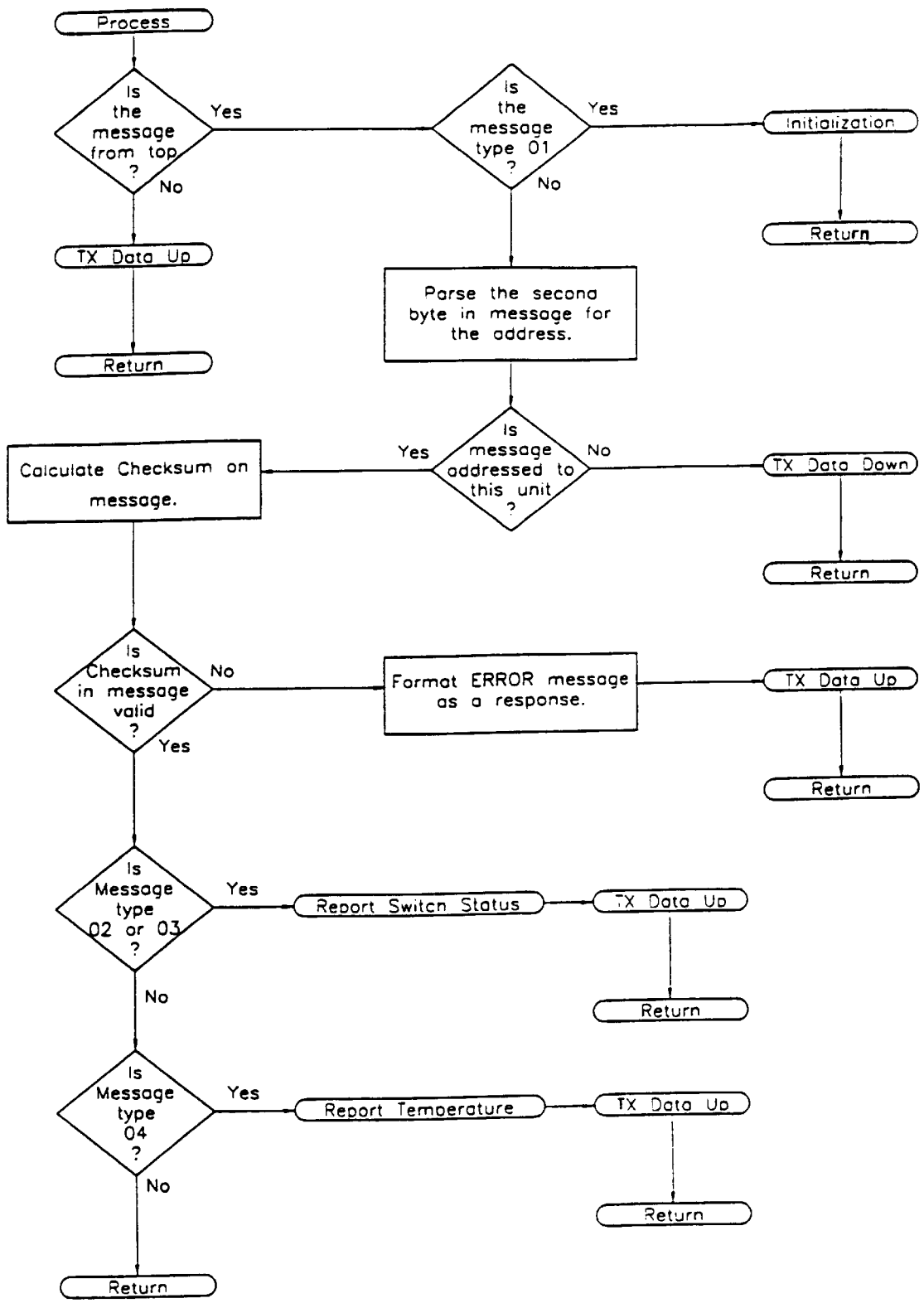
FIG. 25 is a flow chart illustrating the procedure for processing data in a module unit.

The relative location detection device or sensor 20 includes the several components and features described hereinabove. The performance and processes of the sensor 20 are automateable and controlled through the interface unit 160. That interface 160 is connected to a plurality of reporting and repeating modules 120 that are communitively connected thereto, and in most configurations located below the interface 160. This configuration may be best appreciated in FIG. 22 where interconnected power supplying lines, as well as communication lines are illustrated. Details of these components and their functions will be described in greater detail hereinbelow. In FIG. 22, each module represents one or more panels 53 configured as described hereinabove. For better appreciation of the inter-connections achieved upon a given panel 53, reference may be made to FIG. 19 wherein a schematic of the panel's 53 printed computer circuit board is illustrated, together with FIG. 20 that illustrates the connections for each switch carried on the panel and FIG. 21 that shows the communicating connections across a particular panel 53 for achieving both power transmission and data communication across the length of that panel 53 and interconnection to an adjacent panel 53 of the module.

The unique methods of operation of the present invention may be appreciated in a review of FIG. 22. Therein, the controlling interface unit 160 is shown connected to each module 120, though only directly to the first module 120 immediately therebelow, and then indirectly through subsequent modules to each module further below. Communication is achieved between the interface 160 and the several modules 120 through a repeated messaging process. That is, each module 120 receives a message from the interface unit 160 or a module 120, which ever is immediately above that module, and processes that message and if appropriate repeats that message to the module 120 immediately therebelow. Because of this repeating process, it is necessary that the communication signals only have a strength sufficient to reach the next module 120 which is proximate thereto. It also assures that any message can be sent over any distance to a module 120 remotely and distantly located therefrom because that message will be repeated at a sufficient transmission level by each module 120 located between the issuing interface 160 and the remote target module 120. This is a unique feature in comparison to previously known devices wherein messages were sent across the entire distance from the issuing controller to the remote target sensing structure. For these reasons, the practical lengths at which those previously known devices could be constructed were limited by the communication capabilities. This is in stark contrast to that of the present invention which may communicate over extremely large distances. In fact, the present invention may be considered to be without practical limitations with respect to length because of this unique repeater capability. The capacity for repeating messages is bidirectional; that is, polling messages from the interface 160 may be issued down the sensor 20 and condition reporting messages can be repeatedly communicated up the sensor 20 from reporting modules 120.

In practice and at field sites, the several modules 120 that make up a particular sensor 20 may be assembled in any order. This is permitted by the modular construction wherein each detection unit 40 has both a plug end 42 and a plug receiving end 44 so that an end-to-end plugged series 46 may be established to create a sensor 20. Through the operation and communications between the interface unit 160 and the several modules 120, each module 120 is issued and designated its particular address which corresponds to its position within the series 46 in response to commands issued by the interface unit 160. Simply stated, the interface unit 160 initializes the number one, or top module 120 which receives such designation and stores the same. That number one module 120 then increments its address or position plus one and sends that specification to the next immediately below module 120, which in the case of module number one 120 would be module number two 120. This procedure is repeated down the module string of the series 46 until the last module 120 is addressed and reports that no modules 120 are located therebelow.

Because the sensor 20 will often be located at remote locations where independent power supplies are necessary, it is important that power be conserved by the sensor 20 and associated hardware such as the remote terminal unit and communication facilities for transmitting information therefrom. To assist in this goal, the detection sensor 20 has been designed so that the interface 160 and modules 120 only consume power for brief periods during which they are operational, but retire to "sleep" modes wherein power consumption is greatly reduced, if not ceased. Because of these intermittent sleep modes, each so sleeping device must be awakened and powered-up for performance. This is normally achieved in an initialization process wherein the above described addressing of each module 120 is achieved.

As previously described, each sensor 20 is designed to report at least one relative position of an indicator positioned adjacent to a detection unit 40 of the sensor 20. Other types of data such as temperature and pressure may also be reported at particular modules 120. This information is ascertained in the preferred embodiment from the detection of closed reed switches 64 across which current is permitted to pass due to the closed configuration of the switch 64. Quantities such as temperature and pressure may be observed by conventional sensing means that are reported to a particular module 120. Either on command or at specified intervals, the controlling interface 160 will poll the sensor string 20 for detectable conditions. This polling may be of two general types: global or module specific. In the instance of a global polling, the interface 160 will send a query to the first module 120 which processes the solicitation for information and responds either with the information or that it does not have the requested information available. That module 120 will then repackage the query and send it to the next module in the series 46. A similar routine is executed at the second module 120 which after reporting its status repackages the query and passes it to the next module 120. In the instance of a global polling, this procedure will be repeated down the string 46 until the last module 120 has been solicited. In response to that global query, that last module 120 will not only report its status with respect to the solicited information, but will also inform the interface 160 that it is the last module 120 and the bottom of the string 46 has been reached. In the instance of a module specific query, each module 120 will accept the query and notice that it is not the one to which the solicitation is addressed. That module 120 will then immediately repackage the query and pass to the next module 120 which will execute a similar routine. This process is repeated until the intended and addressed module 120 is reached. That particular module 120 will then execute the indicated routine and report the solicited data. Because the appropriately addressed module 120 has been reached, the query will not be repackaged and passed further down the string, but instead it will terminate at that intended location. Each of these modes for messaging and the common repeating features between the two are unique to the present invention and provide vast improvements in respect to not only communication over the short distances between sequential modules 120 but across the entire string 46 which may have a substantial length over which previously known methods would have been incapable of achieving.

With these performance features and methods of operation of the relative location detection sensors 20 of the present invention understood, it is appropriate to address the structure and micro-operation of the several components in greater detail. As previously described, the primary function of the interface unit 160 is to collect temperature and level data from the modules, process the data relative to the complete sensor assembly and transmit this processed data to the outside world. The protocols used to transmit processed level and temperature data may vary according to the requirements of the equipment to which the sensor 20 is interfaced. Other functions of the interface include management of intermodule communications, diagnostics and sensor configuration. The interface unit consists of a powerful 8 bit microprocessor, external interface electronics and power supply regulation/management circuitry.

Each module has its own microprocessor. This processor is capable of scanning up to one hundred and twenty switches and one temperature sensor. At one-half inch switch 64 spacing, the maximum module 120 length is five feet. Given standard module lengths of three, four and five feet, any active sensor length of three feet and up may be configured in one foot increments. Each module 120 collects level and temperature data independent of other modules 120. These data are passed module 120 to module 120 until received by the interface unit 160 to be processed and reported.

Each interface unit 160 will have a serial port for connection to a personal computer or laptop computer. This port is used to configure the sensor and to perform diagnostics. This port may also be used to transmit processed data to an external device if the proper interface driver is installed.

The interface unit 160 regulates power for the entire sensor 20. The interface processor 160 controls the power to the modules 120. Module power may be cut off for the referenced sleep modes to conserve power or to initiate module processor reset.

The interface processor 160 has eeprom to store configuration data such as module unit 120 number, level and temperature offsets, and the number of floats utilized in the particular sensor 20. The interface 160 may optionally include additional eeprom, flash or non-volatile static memory for downloadable program code and long term data storage. A real time clock module may be connected to the interface 160 to provide date and time stamps for long term data.

Each module may have up to one hundred and twenty reed switches 64 installed with constant spacing between adjacent switches 64. This constant spacing is determined by the configuration of the printed computer board layout that forms the support board 52 and must be hard coded into the module processor's code space. There is a one-half space above the top switch 64 and below the bottom switch 64 in each module 120. This arrangement allows modules 120 to be assembled in any order in a sensor 20. Electrically, the switches 64 are arranged in a 10×12 matrix with reverse blocking diodes and pull up resistors to enable matrix scanning. By convention, switches 64 are numbered from one to one hundred and twenty, starting at the bottom of the module 120. The number one switch 64 is associated with the bottom of the matrix. Modules 120 with fewer than one hundred and twenty switches 64 are arranged with the missing switches 64 at the top of the matrix. The number of switches 64 in a module 120 must also be hard coded in the module's processor.

Each module 120 may have a single digital temperature sensor directly connected to the processor using three digital lines. After reset or power up, the module processor polls the digital lines to determine if a temperature sensor is installed.

Six lines are used to connect adjacent modules and also the interface unit to the top module as shown in FIG. 22. Two lines are connected from the power bus; +5 volts and ground. The +5V line is switched by the interface unit 160. Inteiprocessor communications are handled by the remaining four lines; a line for data going down the sensor 20, another line for data going up the sensor 20, and a clock line for each of the data lines. These do not form a true bus as each line is terminated at a processor in the reporting and repeating module 120 or interface unit 160. There is no hardwire pass through for data at each processor. Data pass through at a processor is handled by software only. The bottom module 120 has no processor below it and these data lines are left open.

The sensor 20 may be described as an array of dedicated processors closely linked by a local area network (LAN).

The hardware layer of the LAN is described above. The transport layer implements unidirectional data and clock lines. The signal levels on these lines are 0 and 5 volts. Data-clock synchronization is enhanced by feedback on the return clock line. This is best described by example and reference to FIG. 22. The interface unit shifts the high bit of the byte to the Data1 line, then brings Clock1 high. Module 1, alerted by the low to high transition on the Clock1 line, initiates a buffered receive routine, and shifts in the bit represented by the level on the Data1 line. Module 1 shifts the Clock2 level to 5 volts echoing the Clock1 pulse. The interface unit detecting the Clock1 level feedback on the Clock1 line knows the transmission of the first bit is complete and brings Clock1 low. Module 1 again echoes the Clock1 live on the Clock2 line. This sequence of events is repeated for the remaining bits.

The interface unit expects the Clock1 phase echo on the Clock2 line within one millisecond of the level change on the Clock1 line. If this echo does not occur within the specified time frame, the interface unit will reset the network by bringing the +5 volt bus line to 0 volts for 10 milliseconds to restart all module processors on the network.

A simple set of commands issued by the interface unit to the module processors initializes and retrieves data collected by the modules. Commands and responses travel the network in message packets of 3 to 18 bytes in length.

| Byte 1: | bits 7-4 | Message type (value = 0 to 15) |
|---|---|---|
| | bits 3-0 | Number of data bytes in packet (value = 0 to 15) |
| Byte 2: | bits 7-0 | Module address (value = 0 to 255) |
| [Byte 3–17] | | 0 to 15 Data bytes (depends on the message type and Number of data bytes embedded in byte 1 of the packet) |
| Byte 18 | | Check sum of previous bytes in the packet. |

Figure 26:
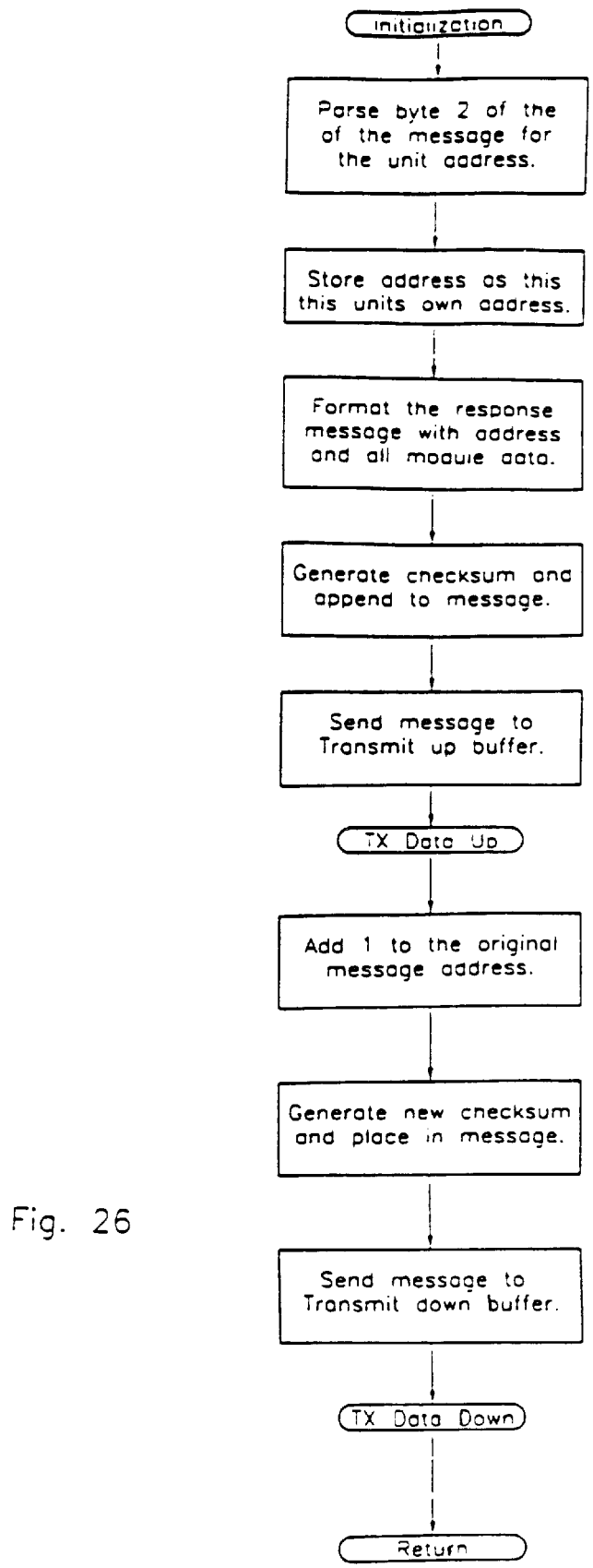
FIG. 26 is a flow chart illustrating the initialization procedure for a module unit.
Figure 27:
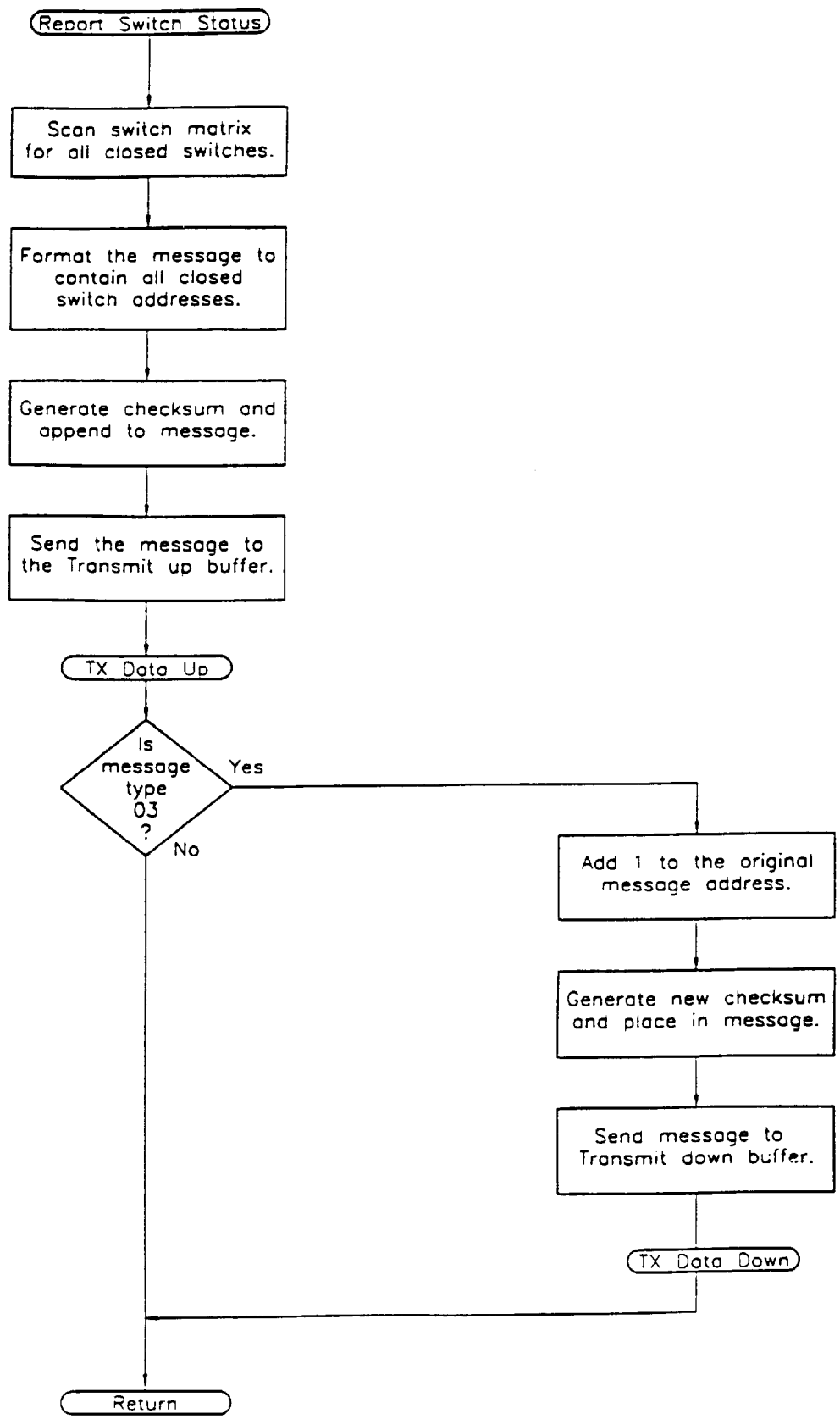
FIG. 27 is a flow chart illustrating the procedure for reporting switch status in a module unit.
Figure 28:
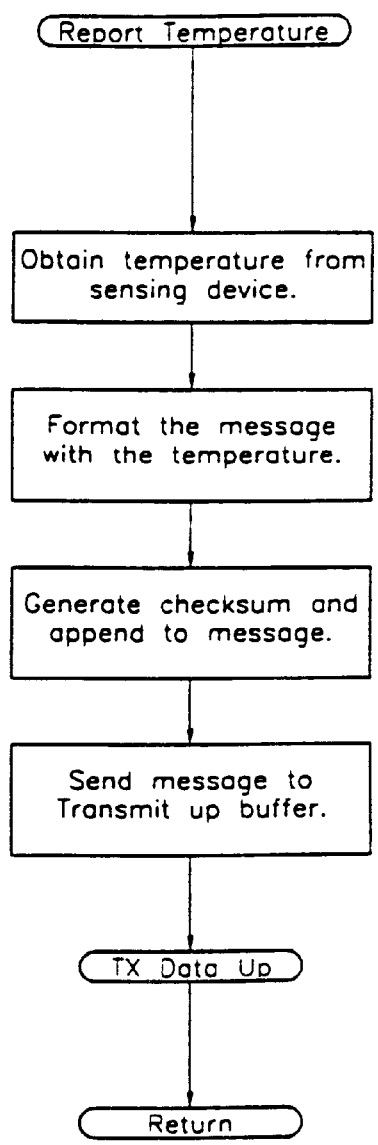
FIG. 28 is a flow chart illustrating the procedure for reporting a sensed temperature at a module unit.
Figure 29:
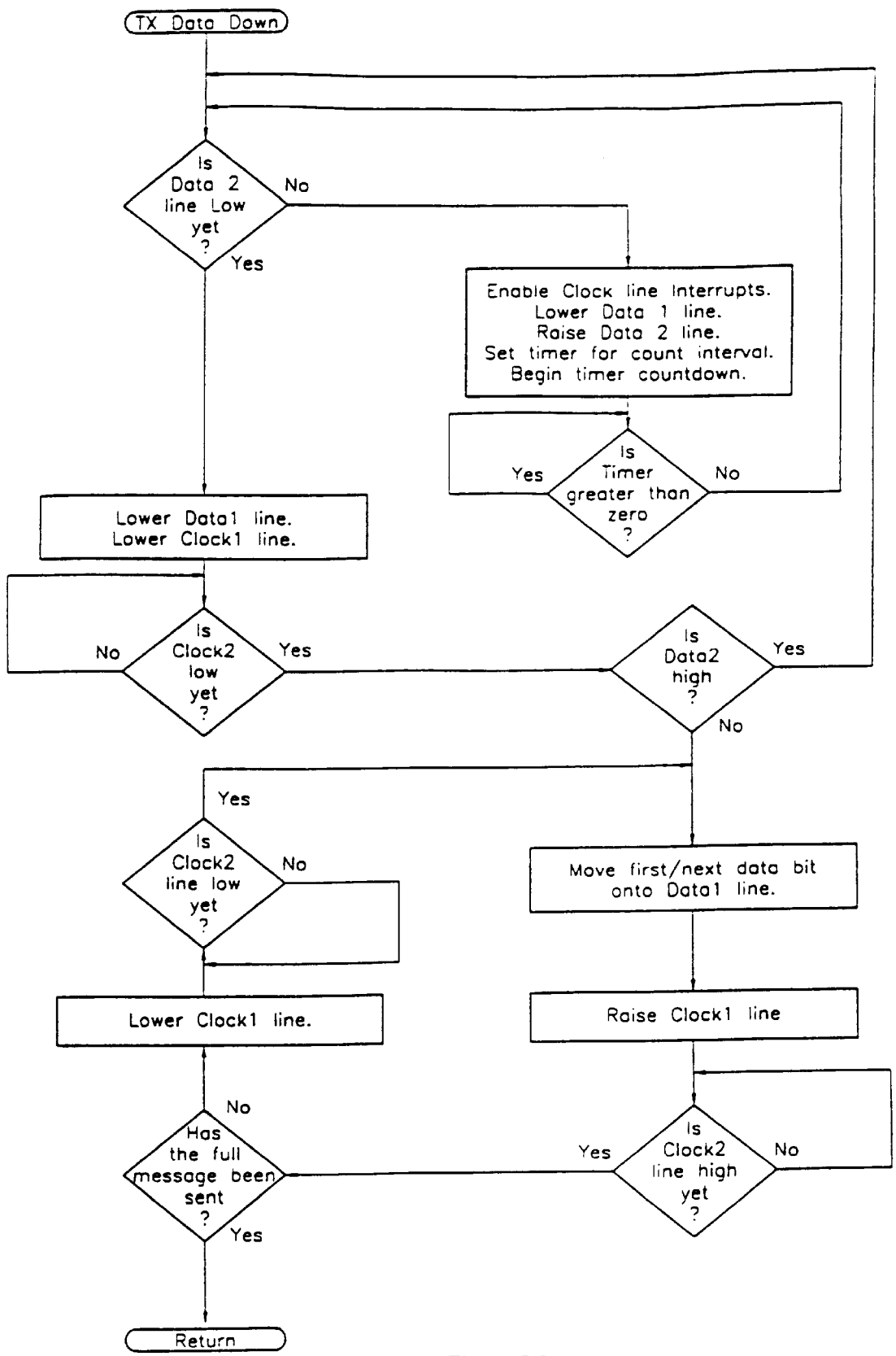
FIG. 29 is a flow chart illustrating the procedure for transmitting data, normally queries, down the detection unit of the sensor.
Figure 30:
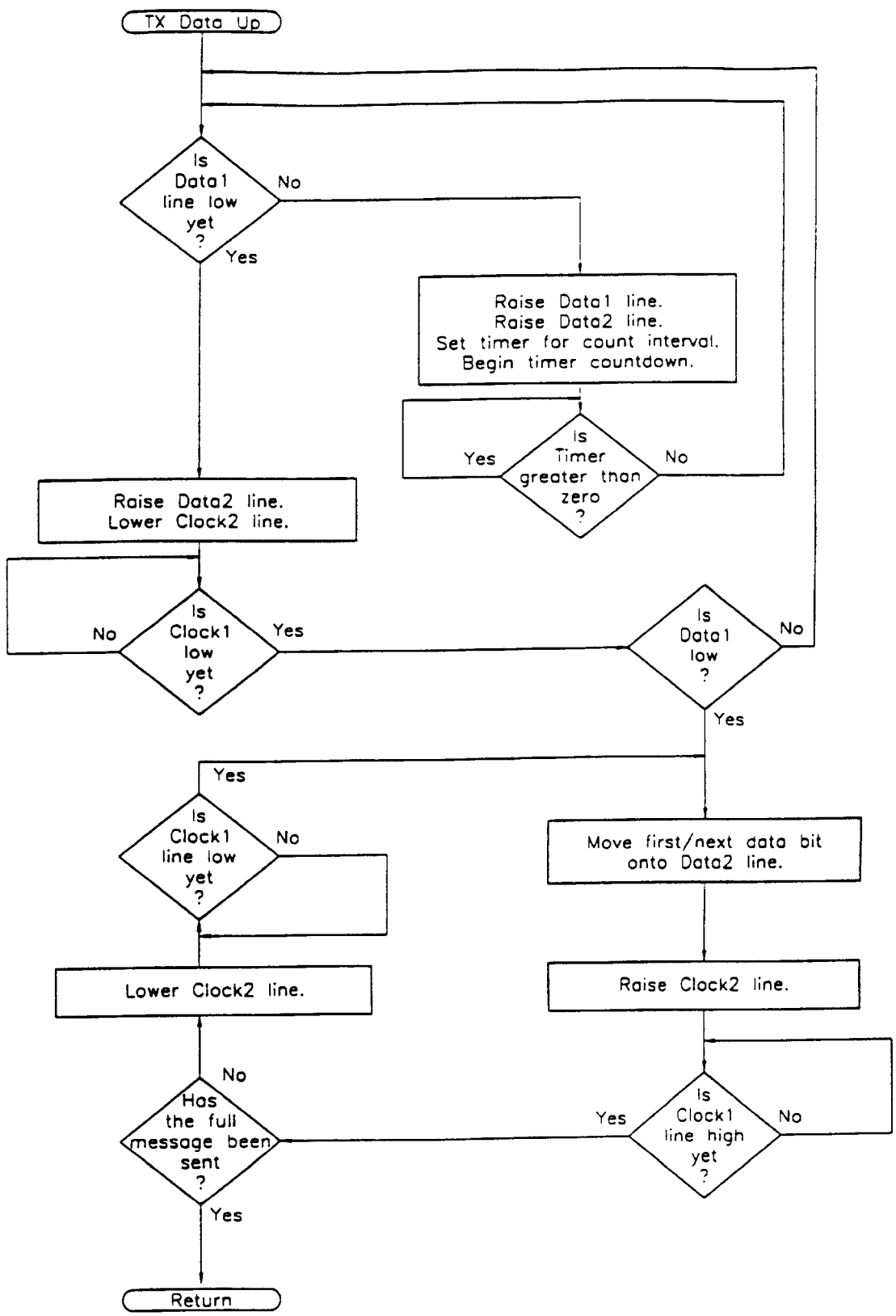
FIG. 30 is a flow chart illustrating the procedure for reporting sensed information up the detection unit of the sensor.

When the sensor 20 is first powered up, the interface processor 160 executes its initialization routines (See FIG. 26). This process should be complete less than one millisecond after application of full power to the sensor 20. The interface processor 160 activates the 5 volt power bus to the module processors 120 and waits 99 milliseconds. Each of the module processors 120 executes a power up sequence and initializes all registers and goes to sleep during this time window. Sleep mode issued by the module processors 120 during any idle time to minimize the current consumption of the total sensor. Any module processor 120 will "wake up" when a low to high transition occurs on either the Clock1 or Clock2 lines.

The interface processor transmits the initialize configuration command as shown immediately below to the top module in the sensor 20 at the expiration of the 100 msec. power up cycle.

| 10h | message type = 1 |
|---|---|
| | data bytes = 0 |
| 00h | module address = 0 |
| 10h | last byte = checksum |

Module 1 verifies the received packet, stores the module address and builds a configuration response message packet as shown immediately below:

| 13h | message type = 1 |
|---|---|
| | data bytes = 3 |
| 00h | module address = 0 |
| 78th | bit 7 = 0 (no temperature present) |
| | bits 6 to 0 = 120 (number of switches in module) |
| 3ch | module length = 60 |
| 10h | bit 7 = 0 (module length units: 0 = inches 1 = cm) |
| | bits 6 to 0 = 10h (module processor software ver.) |
| xxh | last byte = checksum |

The message type stays the same but there are 3 data bytes in the response. The module processor scanned for a temperature sensor during power up initialization. The remaining data; switch count, module length, length units and software version, are hard coded in the processor's program space and are integrated into the remaining data bytes. Checksum calculation completes the response packet. The response is transmitted up the series 46 to the interface unit 160. After transmission, module 1 modifies the original initialize configuration packet by incrementing the module address and recalculating the checksum. This new initialize configuration packet is transmitted to module 2 and the module 1 processor goes to sleep. The last module on the sensor has a transmission timeout error while attempting to send the initialize configuration packet down the network. Upon detection of this error, the module processor will create a dummy initialize configuration packet for the non-existent module with no temperature sensor, no switches and zero length and transmit the dummy initialize configuration packet UP the network. The interface unit will recognize this as the bottom of the level sensor.

Module 2 is not directly connected to the interface unit, so module 1 must wake up and relay module 2's response to the interface. In fact, any message packet received by a module from a module below it is automatically relayed UP the network. There is no packet verification performed on relayed message packets.

The interface unit builds a module configuration database from the configuration response packets. It will use this database to assemble raw level data into a form with real world significance.

Each module is assigned a unique sequential address as the initialize configuration packet is modified and passed to the next module. This feature allows module segments to be assembled in any order in the field.

A module processor will execute the Bad Message sequence shown below if the original command packet did not verify.
1) Set the high bit in the message type field
2) Preserve remaining bytes up to checksum byte
3) Calculate a new checksum
4) Transmit the message UP the network
5) Go to sleep The interface unit may direct any individual module to report the state of its switch array by issuing a Report Switch Status Command as shown below.

| 20h | message type = 2 |
|---|---|
| | data bytes = 0 |
| xxh | module address |
| xxh | checksum |

As each module receives a command it examines the embedded module address to see if it is the target module. Each module is required to verify every command to insure data packet integrity before parsing the message type and module address fields. If the command packet is addressed to another module it is relayed DOWN to the next module.

When the target module receives this command, it scans the level switch matrix and starts building a Switch Status Response Packet as shown below.

| 2fh | message type = 2 |
|---|---|
|  | data bytes = 15 |
| xxh | module address |
| xxh | data byte 1 (switches 1 to 8) |
| ... | data byte 2–14 (switches 9 to 112) |
| xxh | data byte 15 (switches 113 to 120) |
| xxh | checksum |

After checksum calculation the response packet is transmitted up the network, relayed by other modules if necessary.

The interface unit upon sending a command to a target module, calculates a response time limit based on the target module address. The coefficients used in this calculation will be determined empirically during software development. If the response time limit expires with not response the interface unit may reset and initialize the entire sensor or query the target module again.

The interface unit must issue this command at least once for each module to gather switch states for the entire level sensor. The following command requires only one instance to accomplish the same task.

The global report switch status command works much the same way as the Initialize Configuration Command. A single command message packet (a shown immediately below) is addressed to Module 1 requesting a switch status report.

| 30h | message type = 3 |
|---|---|
|  | data bytes = 0 |
| xxh | module address |
| xxh | checksum |

Module 1 acknowledges the command by scanning its switch matrix and returning a Switch Status Response Packet.

| 2fh | message type = 2 |
|---|---|
|  | data bytes = 15 |
| xxh | module address |
| xxh | data byte 1 (switches 1 to 8) |
| ... | data byte 2–14 (switches 9 to 112) |
| xxh | data byte 15 (switches 113 to 120) |
| xxh | checksum |

Module 1 increments the module address in the original command packet and calculates a checksum. This modified command packet is transmitted DOWN to the next module and Module 1 goes to sleep.

This sequence is repeated until the last module has transmitted its switch status report. The last module increments the module address in the command packet and sends the packet up the network. This last packet serves as a response for the bottom dummy module. This last response may seem useless, but it signals to the interface unit that the transport layer of the network is functional all the way to the bottom of the level sensor.

The interface unit may query each module having a temperature sensor with a Report Temperature Command packet.

| 40h | message type = 4 |
|---|---|
|  | data bytes = 0 |
| xxh | module address |
| xxh | checksum |

Network transmit/receive behavior is similar to that described in Report Switch Status Command. The Report Temperature Response Packet is as shown below.

| 42h | message type = 4 |
|---|---|
|  | data bytes = 2 |
| xxh | module address |
| xxh | temperature high byte |
| xxh | temperature low byte |
| Xxh | checksum |

There is no Global Report Temperature Command because most level sensors will have only one module with a temperature sensor installed.

A position detection system and its components have been described herein. These and other variations which will be appreciated by those skilled in the art are within the intended scope of this invention as claimed below. As previously stated, detailed embodiments of the present invention are disclosed herein; however, it is to be understood that the disclosed embodiments are merely exemplary of the invention that may be embodied in various forms.

A position detection system and its components have been described herein. These and other variations which will be appreciated by those skilled in the art are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability in multiple industries in which the relative location of one component relative to another is desired to be detected. More specifically, the present invention finds particular applicability in those industries wherein liquid levels are desired to be sensed, for example in subterranean formations and above and below ground reservoirs or tanks.

What is claimed and desired to be secured by Letters Patent is as follows:

1. A relative location sensor comprising:

an elongate detection unit having a longitudinal axis, said detection unit comprising:

a support member having a mounting surface and a longitudinal axis, said longitudinal axis of said support member being oriented substantially parallel to said longitudinal axis of said detection unit; and a reed switch having a body and a longitudinal axis, said reed switch being supported upon said support member and oriented so that said longitudinal axis of said reed switch is substantially perpendicular to said longitudinal axis of said support member; and said reed switch being at least partially supported on said mounting surface of said support member and arranged so that at least a portion of said reed switch body is positioned closer to said longitudinal axis of said support member than said mounting surface is located relative to said longitudinal axis of said support member thereby reducing the susceptibility of said detection unit to failure from flexing or twisting of said detection unit or from direct contact with said reed switch.

2. The relative location sensor as recited in claim 1, further comprising:

said reed switch being at least partially located exteriorly to said support member.

3. The relative location sensor as recited in claim 1, further comprising:

said support member having a recess space therein and said reed switch being at least partially positioned in said recess.

4. The relative location sensor as recited in claim 1, further comprising:

said support member having an aperture extending therethrough and said reed switch being at least partially positioned in said aperture.

5. The relative location sensor as recited in claim 1, wherein said reed switch further comprises at least one outwardly extending lead, said at least one lead being affixed to said mounting surface exteriorly of said support member.

6. The relative location sensor as recited in claim 1, wherein said detection unit is constructed to be sufficiently flexible to be bent into an arc along said support member longitudinal axis, said arc having a radius at least as short as one and one half feet.

7. The relative location sensor as recited in claim 1, further comprising a plurality of elongate detection unit plugged into an end-to-end configuration.

* * * * *